(12) United States Patent
Ramasamy et al.

(10) Patent No.: US 11,475,422 B2
(45) Date of Patent: Oct. 18, 2022

(54) BLOCKCHAIN-BASED PROPERTY MANAGEMENT

(71) Applicant: Bank of America Corporation, Charlotte, NC (US)

(72) Inventors: Suki Ramasamy, Chennai (IN); Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 138 days.

(21) Appl. No.: 15/938,184

(22) Filed: Mar. 28, 2018

(65) Prior Publication Data

US 2019/0303893 A1    Oct. 3, 2019

(51) Int. Cl.
| | | |
|---|---|---|
| *G06Q 20/12* | (2012.01) |
| *G06K 7/14* | (2006.01) |
| *G06Q 20/36* | (2012.01) |
| *H04L 67/1087* | (2022.01) |
| *G06K 7/10* | (2006.01) |

(52) U.S. Cl.
CPC ..... *G06Q 20/1235* (2013.01); *G06K 7/10366* (2013.01); *G06K 7/1413* (2013.01); *G06K 7/1417* (2013.01); *G06Q 20/36* (2013.01); *H04L 67/1091* (2013.01); *G06Q 2220/18* (2013.01)

(58) Field of Classification Search
CPC .............. G06Q 20/1235; G06Q 20/36; G06Q 2220/18; G06K 7/10366; G06K 7/1413; G06K 7/1417; H04L 67/1091; H04L 67/12; H04L 67/10; H04L 69/40
See application file for complete search history.

(56) References Cited

U.S. PATENT DOCUMENTS 5,892,900 A  *  4/1999  Ginter ..................... G06F 21/10
                                                          726/26
7,421,372 B1     9/2008  Moss et al.
(Continued)

OTHER PUBLICATIONS

Tautenhan, Kyle; U.S. Appl. No. 62/548,160, filed Aug. 21, 2017 (Year: 2017).*

(Continued)

*Primary Examiner* — John W Hayes
*Assistant Examiner* — Zehra Raza
(74) *Attorney, Agent, or Firm* — Banner & Witcoff, Ltd.

(57) ABSTRACT

Methods, systems, and apparatuses for blockchain-based property management are described herein. According to a first embodiment of the disclosure, a plurality of computing systems may be established at a plurality of points along a supply chain associated with the manufacture, shipment, and sale of a physical property item. At each of the plurality of points, the plurality of computing systems may identify data corresponding to the physical property item, which may be stored on a blockchain associated with a decentralized peer-to-peer (e.g., P2P) network. According to a second embodiment of the disclosure, content creator computing devices may transmit digital property item upload requests to a digital property management computing device, which may generate smart contracts corresponding to the requests. Through execution of the smart contracts, access may be granted to digital property items and fees may be provided to the content creator computing devices.

20 Claims, 20 Drawing Sheets

(56) References Cited

U.S. PATENT DOCUMENTS

| | | | |
|---|---|---|---|
| 7,457,763 B1 | 11/2008 | Garrow et al. |
| 7,584,165 B2 | 9/2009 | Buchan |
| 8,285,517 B2 | 10/2012 | Sillman et al. |
| 8,321,468 B2 | 11/2012 | Thomas et al. |
| 8,504,396 B2 | 8/2013 | Quintus et al. |
| 9,092,307 B2 | 7/2015 | Langer et al. |
| 9,298,806 B1 | 3/2016 | Vessenes et al. |
| 9,397,985 B1 | 7/2016 | Seger, II et al. |
| 9,884,069 B2 | 2/2018 | Tabuteau |
| 9,884,078 B2 | 2/2018 | Harrell |
| 9,884,152 B2 | 2/2018 | McLoughlin et al. |
| 9,884,398 B2 | 2/2018 | Choi |
| 9,884,407 B2 | 2/2018 | Ishikawa et al. |
| 9,884,615 B2 | 2/2018 | Pandit et al. |
| 9,884,791 B2 | 2/2018 | Yamashita |
| 9,884,901 B2 | 2/2018 | Fares et al. |
| 9,884,907 B2 | 2/2018 | Zeller et al. |
| 9,884,908 B2 | 2/2018 | Zeller et al. |
| 9,884,912 B2 | 2/2018 | Garcia-Martinez et al. |
| 9,884,932 B2 | 2/2018 | Kobilka et al. |
| 9,884,943 B2 | 2/2018 | Frost et al. |
| 9,885,073 B2 | 2/2018 | Feldman et al. |
| 9,885,076 B2 | 2/2018 | Leamon et al. |
| 9,885,227 B2 | 2/2018 | Leiper et al. |
| 9,885,258 B2 | 2/2018 | Spoor et al. |
| 9,885,807 B2 | 2/2018 | Hunt et al. |
| 9,886,058 B2 | 2/2018 | Zaitsev et al. |
| 9,886,210 B2 | 2/2018 | Frank et al. |
| 9,886,270 B2 | 2/2018 | Bestfleisch et al. |
| 9,886,303 B2 | 2/2018 | Koller Jemio et al. |
| 9,886,486 B2 | 2/2018 | de Castro Alves et al. |
| 9,886,496 B2 | 2/2018 | Leininger et al. |
| 9,886,583 B2 | 2/2018 | Aguayo Gonzalez et al. |
| 9,886,660 B2 | 2/2018 | Hammerschmidt et al. |
| 9,886,684 B2 | 2/2018 | Baron |
| 9,886,707 B1 | 2/2018 | Chang et al. |
| 9,886,713 B2 | 2/2018 | Borom et al. |
| 9,886,731 B2 | 2/2018 | Ding et al. |
| 9,886,810 B1 | 2/2018 | Murphy |
| 9,886,845 B2 | 2/2018 | Rhoads et al. |
| 9,887,295 B2 | 2/2018 | Suzawa et al. |
| 9,887,299 B2 | 2/2018 | Yamazaki et al. |
| 9,887,555 B2 | 2/2018 | Sultenfuss et al. |
| 9,887,560 B2 | 2/2018 | Banos et al. |
| 9,887,561 B2 | 2/2018 | Jouper et al. |
| 9,887,893 B2 | 2/2018 | Vaswani et al. |
| 9,887,898 B2 | 2/2018 | Frei et al. |
| 9,887,899 B2 | 2/2018 | Sturrock et al. |
| 9,887,900 B2 | 2/2018 | Sturrock et al. |
| 9,887,934 B2 | 2/2018 | Chaudhari et al. |
| 9,887,936 B2 | 2/2018 | Maino et al. |
| 9,887,970 B2 | 2/2018 | Luff et al. |
| 9,888,067 B1 | 2/2018 | Yemini et al. |
| 9,888,105 B2 | 2/2018 | Rhoads |
| 9,888,107 B2 | 2/2018 | Mamdani et al. |
| 9,888,112 B1 | 2/2018 | Hodge |
| 9,888,118 B2 | 2/2018 | Lugiai et al. |
| 9,888,353 B2 | 2/2018 | Reed et al. |
| 10,740,849 B1 | 8/2020 | Leise et al. |
| 10,891,686 B1 | 1/2021 | Rao et al. |
| 2016/0098723 A1 | 4/2016 | Feeney |
| 2016/0210710 A1* | 7/2016 | Glennon | G06Q 50/184 |
| 2016/0260171 A1 | 9/2016 | Ford et al. |
| 2016/0261404 A1 | 9/2016 | Ford et al. |
| 2016/0292680 A1 | 10/2016 | Wilson, Jr. et al. |
| 2017/0024813 A1 | 1/2017 | Crouspeyre et al. |
| 2017/0046526 A1 | 2/2017 | Chan et al. |
| 2017/0046709 A1 | 2/2017 | Lee et al. |
| 2017/0116693 A1* | 4/2017 | Rae | G06Q 20/3827 |
| 2017/0140375 A1 | 5/2017 | Kunstel |
| 2017/0178237 A1 | 6/2017 | Wong |
| 2017/0206532 A1 | 7/2017 | Choi |
| 2017/0221029 A1 | 8/2017 | Lund et al. |
| 2017/0232300 A1 | 8/2017 | Tran et al. |
| 2017/0236094 A1 | 8/2017 | Shah |
| 2017/0330174 A1 | 11/2017 | Demarinis et al. |
| 2018/0096175 A1 | 4/2018 | Schmeling et al. |
| 2018/0108089 A1 | 4/2018 | Jayachandran |
| 2018/0117447 A1 | 5/2018 | Tran et al. |
| 2018/0174094 A1 | 6/2018 | Ren et al. |
| 2018/0189813 A1 | 7/2018 | Neal |
| 2018/0300671 A1 | 10/2018 | Richardson et al. |
| 2018/0314258 A1 | 11/2018 | Brew et al. |
| 2018/0314809 A1* | 11/2018 | Mintz | H04L 9/3236 |
| 2018/0315055 A1 | 11/2018 | Pickover et al. |
| 2018/0322597 A1 | 11/2018 | Sher |
| 2019/0005595 A1* | 1/2019 | Tautenhan | G06Q 30/08 |
| 2019/0044700 A1 | 2/2019 | Leddy |
| 2019/0130394 A1 | 5/2019 | Stollman et al. |
| 2019/0158270 A1 | 5/2019 | Berti |
| 2019/0171438 A1 | 6/2019 | Franchitti |
| 2020/0042989 A1 | 2/2020 | Ramadoss et al. |
| 2020/0143300 A1 | 5/2020 | Weldemariam et al. |
| 2020/0160466 A1 | 5/2020 | Hori |
| 2020/0213329 A1 | 7/2020 | Simons |
| 2020/0380090 A1* | 12/2020 | Marion | H04L 9/3239 |

OTHER PUBLICATIONS

Tautenhan et al., U.S. Appl. No. 62/548,160, filed Aug. 21, 2017 (Year: 2017).*

White, How Computers Work, 7th Ed. (Year: 2003).*

Waltonchain Team, "Waltonchain White Paper," V 1.0.3, Oct. 9, 2017, retrieved from https://www.waltonchain.org/upload/1507947652573.pdf, 67 pages.

Modum Whitepaper, "Data Integrity for Supply Chain Opertions, Powered by Blockchain Tehcnology," V. 1.0, 2017, retrieved from https://modum.io/.../uploads/2017/08/modum-whitepaper-v.-1.0.pdf, 20 pages.

Aug. 14, 20194—U.S. Notice of Allowance—U.S. Appl. No. 15/938,120.

Apr. 3, 2020—U.S. Non-Final Office Action—U.S. Appl. No. 15/938,410.

Aug. 21, 2020—U.S. Final Office Action—U.S. Appl. No. 15/938,410.

Aug. 20, 2020—U.S. Non-Final Office Action—U.S. Appl. No. 15/938,545.

Jan. 4, 2021—U.S. Non-Final Office Action—U.S. Appl. No. 15/938,410.

Apr. 7, 2021—U.S. Non-Final Office Action—U.S. Appl. No. 15/938,410.

Feb. 21, 2021—U.S. Non-Final Office Action—U.S. Appl. No. 15/938,545.

* cited by examiner

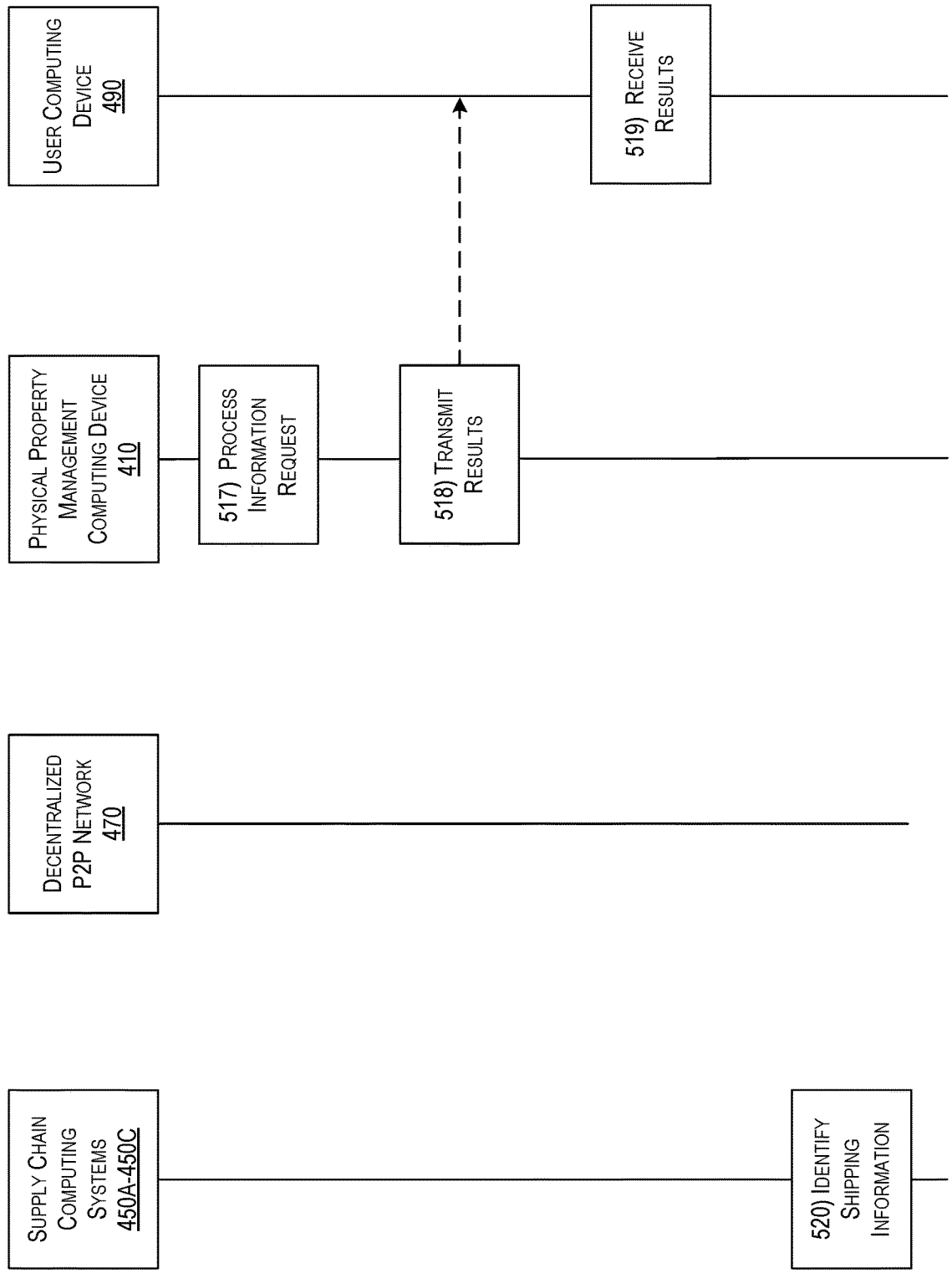

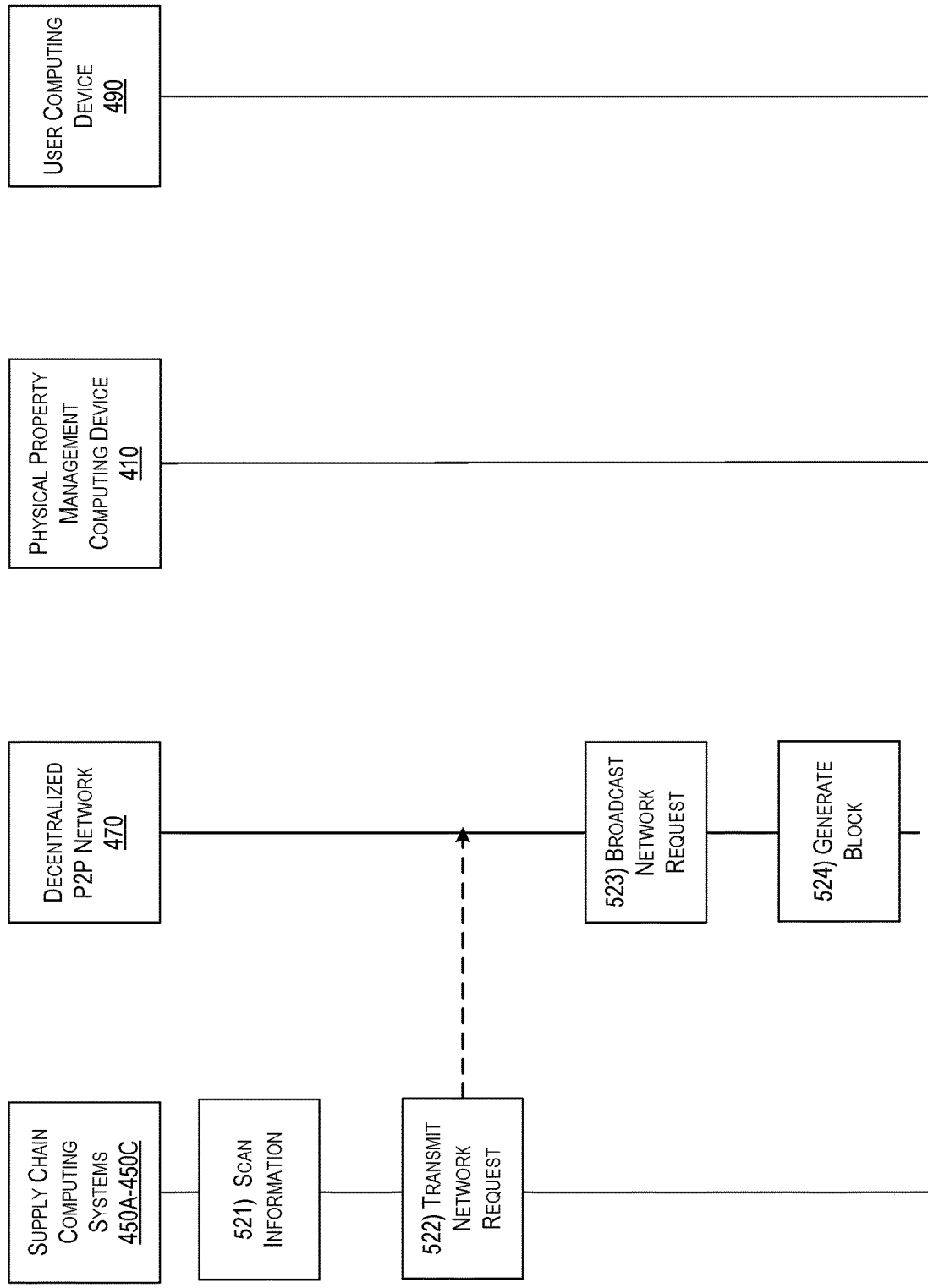

US 11,475,422 B2

BLOCKCHAIN-BASED PROPERTY MANAGEMENT

CROSS-REFERENCE TO RELATED APPLICATIONS

This application is related to U.S. application Ser. No. 15/938,120 entitled "Blockchain-based Property Management", U.S. application Ser. No. 15/938,410 entitled "Blockchain-based Property Utilization", and U.S. application Ser. No. 15/938,545 entitled "Blockchain-based Property Repair", which are being filed concurrently with this application and which are herein incorporated by reference in their entirety.

FIELD

Aspects described herein generally relate to decentralized peer-to-peer (e.g., P2P) computer systems specialized for the purpose of managing a blockchain. In particular, one or more aspects of the disclosure relate to managing physical and/or digital property items on or using a blockchain.

BACKGROUND

Centralized computing systems may be used to manage information related to both physical and/or digital property items. In regard to physical property items, centralized computing systems may receive information from a plurality of entities along a supply chain related to the manufacture, shipment, and sale of the physical property items. While traversing the supply chain, however, the physical property items may be tampered with and the information provided by the entities along the supply chain may be manipulated in order to hide any changes made to the physical property items. In regard to digital property items, centralized computing systems may receive digital property from a plurality of entities, such as content creators including musical artists, film directors, graphic artists, and the like, and may control the dissemination of the digital property to users (e.g., content consumers) of the centralized system in return for a subscription fee provided by the content consumers. Content creators, however, may be paid royalties by the centralized computing systems which may be determined on a one size fits all basis that lacks the granularity to sufficiently compensate the creators relative to engagement by consumers.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards managing information related to physical and/or digital property items on a blockchain.

In accordance with one or more embodiments, a system may comprise a first computing system including one or more sensors, one or more scanners, and at least a first computing device communicatively coupled to the one or more sensors and one or more scanners, wherein the first computing device may be configured to identify, by the one or more sensors of the first computing system, manufacture data of a physical property item. The first computing device may scan, by the one or more scanners of the first computing system, a tag associated with the physical property item to associate the identified data with the physical property item. The first computing device may transmit a network function request to a decentralized P2P network, the network function request including the identified data. The system may further include one or more nodes of the decentralized P2P network which may be configured to execute one or more network protocols to generate a block of a blockchain of the decentralized P2P network, the block comprising the network function request.

In some embodiments, the system may further comprise a second computing system including one or more sensors, one or more scanners, and at least a second computing device communicatively coupled to the one or more sensors and one or more scanners, wherein the second computing device may be configured to identify, by the one or more sensors of the second computing system, shipment data of the physical property item. The second computing device may scan, by the one or more scanners of the second computing system, the tag associated with the first physical property item to associate the shipment data with the physical property item. The second computing device may transmit a second network function request to the decentralized P2P network, the second network function request including the shipment data. The one or more nodes of the decentralized P2P network may be configured to execute one or more network protocols to generate a second block of the blockchain, the second block comprising the second network function request.

In some embodiments, the system may further comprise a property management computing device configured to receive, from a user computing device, an information request corresponding to the physical property item. Based on the information request, the property management computing device may identify the first block and the second block of the blockchain. The property management computing device may transmit, to the user computing device, the manufacture data and the shipment data.

In some embodiments, the first network function request, second network function request, and information request may each include an identifier corresponding to the physical property item, and wherein the property management computing device may be further configured to search the blockchain based on the identifier corresponding to the physical property item. Based on the identifier corresponding to the physical property item, the property management computing device may identify the first block and the second block.

In some embodiments, the system may further comprise a third computing system including one or more sensors, one or more scanners, and at least a third computing device communicatively coupled to the one or more sensors and one or more scanners, wherein the third computing device may be configured to identify, by the one or more sensors of the third computing system, sales data of the physical property item. The third computing device may scan, by the one or more scanners of the third computing system, the tag associated with the first physical property item to associate the sales data with the physical property item. The third computing device may transmit a third network function request to the decentralized P2P network, the third network function request including the sales data. The one or more nodes of the decentralized P2P network may be configured to execute one or more network protocols to generate a third block of the blockchain of the decentralized P2P network, the third block comprising the third network function request.

In some embodiments, the first computing system may be associated with a manufacturing stage of a supply chain, the second computing system may be associated with a shipping stage of the supply chain, and the third computing system may be associated with a sales stage of the supply chain.

In some embodiments, one or more of the manufacture data, shipment data, and sales data may be established by regulations or certification requirements.

In accordance with one or more other embodiments, a computing device configured to operate in a decentralized peer-to-peer (P2P) network and including at least one or more processors and memory storing at least a portion of a blockchain of the decentralized P2P network may receive a digital property item upload request form at least one of a plurality of content creator computing devices, the digital property item upload request including at least an item of digital property. Based on the digital property item upload request, the computing device may generate a smart contract configured to facilitate a transfer of the digital property item from the blockchain to one or more content consumer computing devices. The computing device may deploy the smart contract to the decentralized P2P network and add a block to the at least the portion of the blockchain of decentralized P2P network, the block comprising the smart contract.

In some embodiments, the computing device may receive a digital property item access request through the decentralized P2P network and from at least one of content consumer computing devices, the digital property item access request corresponding to the digital property item of the smart contract and including a fee. Based on the digital property item access request, the computing device may transmit the fee to the smart contract. The computing device may execute the smart contract and, responsive to execution of the smart contract, may transmit the fee provided by the at least one of the content consumer computing devices to the at least one of the content creator computing devices. Responsive to transmitting the fee, the computing device may transmit the digital property item to the at least one of the content consumer computing devices.

In some embodiments, the fee is transmitted to a first wallet of the at least one of the content creator computing devices, and wherein the digital property item is transmitted to a second wallet of the at least one of the content consumer computing devices.

In some embodiments, the digital property item upload request further includes wallet information associated with each of a plurality of content creator computing devices and a creation responsibility percentage corresponding to each of the plurality of content creator computing devices, and wherein the fee is transmitted to each of the plurality of content creator computing devices based on the wallet information and creation responsibility percentage.

In some embodiments, the item of digital property includes at least one of a song, movie, e-book, work of art, patent, and copyright.

In some embodiments, the fee provided by the at least one of content consumer computing devices corresponds to a permanent download of the digital property item, and wherein transmitting the digital property item to the at least one of the content consumer computing devices includes transmitting the permanent download of the digital property item.

In some embodiments, the fee provided by the at least one of content consumer computing devices corresponds to a single use download of the digital property item, and wherein transmitting the digital property item to the at least one of the content consumer computing devices includes transmitting the single use download of the digital property item.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 5A-5I depict an illustrative event sequence for physical property management in accordance with one or more example embodiments described herein.

DETAILED DESCRIPTION

Figure 1:
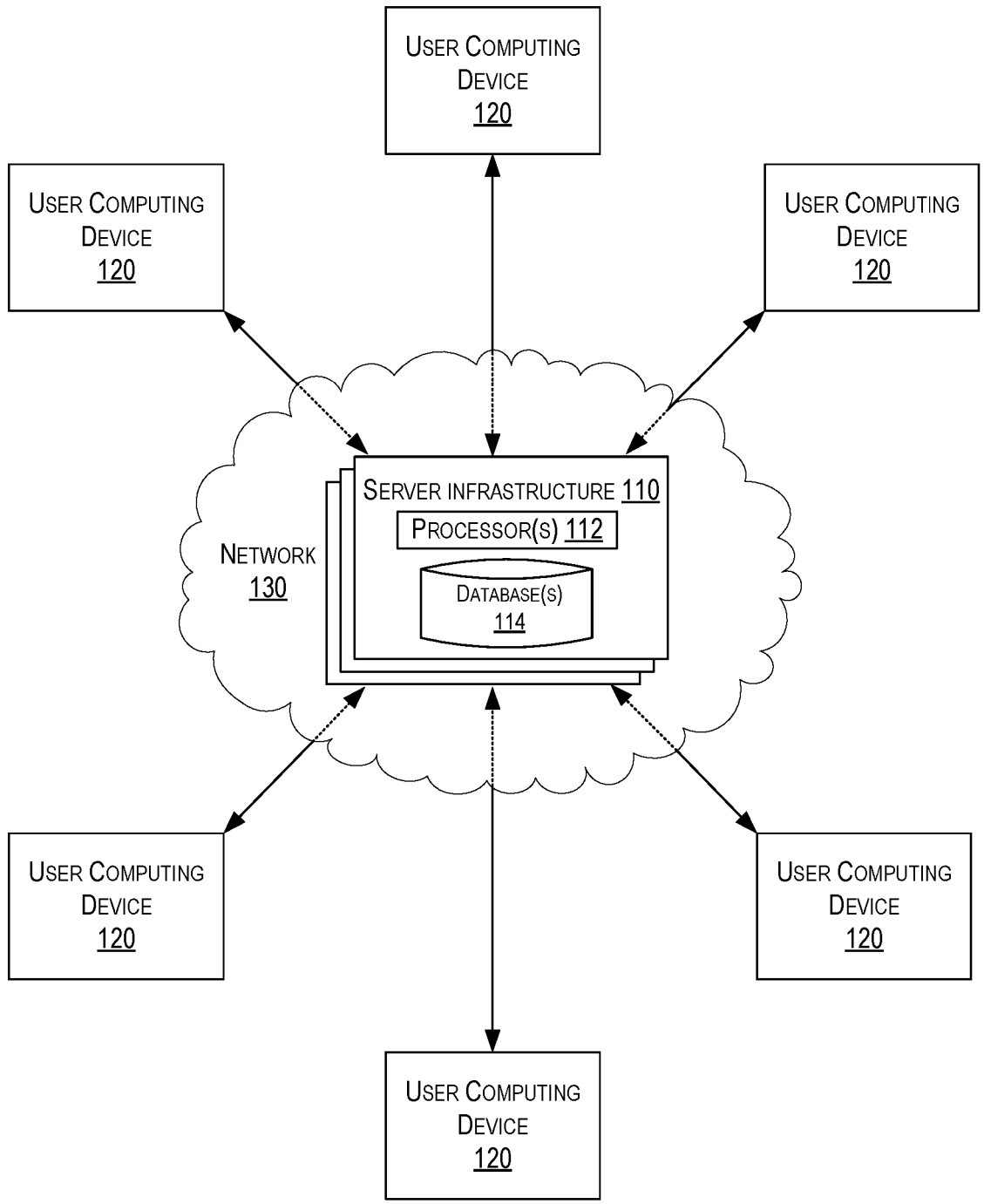
FIG. 1 depicts an illustrative centralized computer system that may be used in accordance with one or more example embodiments described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards apparatuses, systems, and methods for managing physical and/or digital property items on or using a blockchain.

In accordance with a first embodiment of the disclosure, a physical property management system may be configured to manage physical property items provided by a plurality of computing devices operating along a supply chain involving the manufacture, shipment, and sale of the physical property items. The physical property management system may include a plurality of lightweight node computing devices installed at each point along the supply chain. The lightweight node computing devices may be configured to identify information related to the physical property items corresponding to the particular point in the supply chain in which the lightweight node computing devices are installed and transmit network function requests comprising the identified information to a decentralized P2P network of the physical property management system. The network function request may be data storage function request which, when processed by full node computing devices of the decentralized P2P network, may cause the identified information related to the physical property items to be stored on a blockchain of the decentralized P2P network. In the event that the physical property items are tampered with at any point along the supply chain, information related to the tampering may be immutably stored on the blockchain of the decentralized P2P network. In this way, information related to the physical property items may be preserved as the physical property items traverse the supply chain.

In accordance with a second embodiment of the disclosure, a digital property management system may be configured to manage digital property items provided by a plurality of computing devices associated with content creators and distribute the digital property items to a plurality of computing devices associated with content consumers. The digital property management system may include a plurality of computing devices associated with content creators. The plurality of computing devices associated with the content creators may transmit digital property item upload requests including digital property items to a digital property management computing device of the digital property management system. The digital property management computing device may generate smart contracts based off of the digital property item upload requests and deploy the smart contracts to a blockchain of a decentralized P2P network of the digital property management system. The digital property management system may further include a plurality of full node computing devices which may operate to form the decentralized P2P network, maintain the blockchain corresponding to the network, and process requests provided to the network. In the process of deploying the smart contracts provided by the digital property management computing device, the full node computing devices of the decentralized P2P network may store the smart contracts and the digital property items on the blockchain. The digital property management system may further include a plurality of lightweight node computing devices associated with content consumers. The plurality of lightweight node computing devices associated with the content consumers may transmit network function requests to the decentralized P2P network of the digital property management system. The network function requests may be smart contract operations requests which include indications of particular digital property items that are requested to be accessed and fee amounts to be paid to the content creators corresponding to the particular digital property items. In processing the smart contract operation requests provided by the lightweight node computing devices associated with the content consumers, the full node computing devices of the decentralized P2P network may provide access to the digital property items to the lightweight node computing devices of the content consumers and may provide the fee amounts to the content creators. In doing so, the digital property management system may be able to achieve granularity in regard to consumption of digital property which enables payment on a consumption-by-consumption basis to content creators.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, and/or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network and aggregated through execution of the one or more digital cryptographic hash functions and by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, election voting, medical records, currency exchange and remittance, P2P transfers, ride sharing, gaming, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations" and "balance sheet transaction." A smart contract operation, as used herein, may describe one or more operations associated with a "smart contract," which may be one or more algorithms and/or programs stored on a blockchain and identified by one or more wallets and/or public keys within a decentralized P2P network. In performing a smart contract operation, each full node computing device within a decentralized P2P network may identify a block within a blockchain comprising the smart contract and, responsive to identifying the block associated with the smart contract, may execute the one or more algorithms and/or programs of the smart contract. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network. A wallet may be associated with a public key, which may serve to identify the wallet. In requesting performance of network operations, a private key associated with the wallet may be used to digitally sign the network operation requests.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and exploitation and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

Computing Architectures

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and for interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to interlink each of the computing devices comprising server infrastructure 110.

Furthermore, in some embodiments, centralized computer system 100 may include a plurality of computer systems arranged in an operative networked communication arrangement with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and exploitation and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
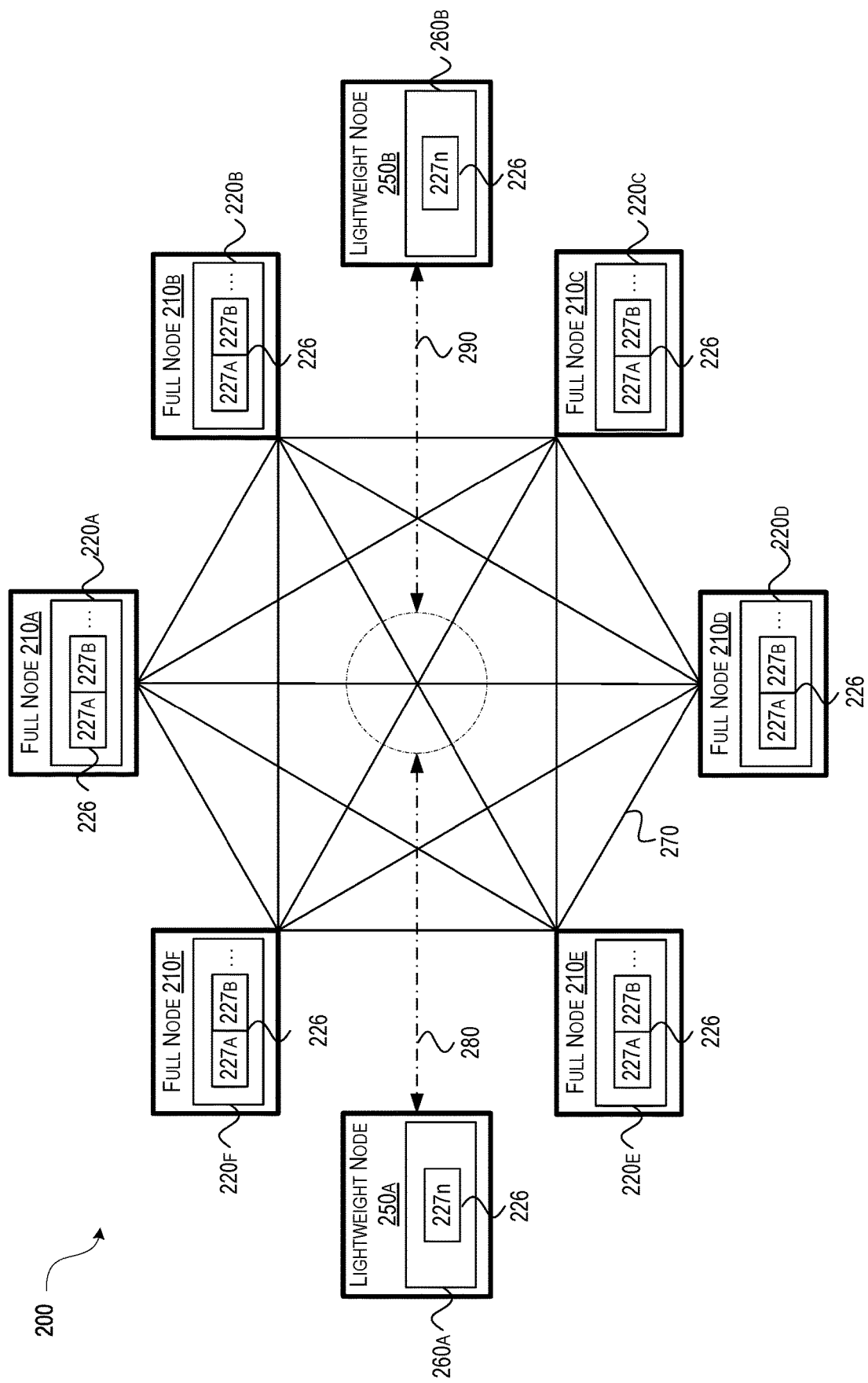
FIG. 2 depicts an illustrative decentralized P2P computer system that may be used in accordance with one or more example embodiments described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and thereby create decentralized P2P network 270. Furthermore, the execution of network protocols by the processors, ASIC devices, and/or GPUs of full node computing devices 210A-210F may cause full node computing devices 210A-210F to execute network functions related to blockchain 226 and maintain decentralized P2P network 270.

Lightweight node computing devices 250A and 250B may request execution of network functions related to decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to decentralized P2P network 270, which may entail a data transfer from a wallet associated with lightweight node computing device 250A to a wallet associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with the wallet of lightweight node computing device 250B. Processors of lightweight node computing device 250A may execute digital signature algorithms to digitally sign balance sheet transaction network function request 280 with the private key associated with the wallet of lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain inter-nodal agreement as to the state of blockchain 226, processors, ASIC devices, and/or GPUs of full node computing devices 210A-210F may execute network protocols to receive broadcast of the network function through decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280 may, in turn, be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudo-randomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated the wallet of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the wallet of the selected full node computing device to be used as the nonce.

In embodiments in which the consensus algorithm is delegated proof of stake (e.g., DPoS), a group of delegates are chosen from full node computing devices 210A-210F by each of computing devices 210A-210F, wherein full node computing devices 210A-210F are allowed to vote on delegates based on balance sheet holdings associated with the respective wallets. Full node computing devices 210A-210F, however, may not vote for themselves to be delegates. Once the group of delegates are chosen, the group of delegates from full node computing devices 210A-210F select a public key associated with a wallet of one of full node computing devices 210A-210F to serve as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key of a wallet associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F corresponding to the nonce to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase balance sheet holdings associated with itself by a predetermined amount. In some arrangements, each of full node computing devices 210A-210F may receive an equal portion of the data transfer amount specified by lightweight node computing device 250A for executing balance sheet transaction network function request 280. After the new block has been added to blockchain 226, balance sheet transaction network function request 280 may be considered to be executed and the data transfer from the wallet associated with lightweight node computing device 250A to the wallet associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function may, in turn, be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to decentralized P2P network 270, which may facilitate a dual data transfer between a wallet associated with lightweight node computing device 250B and a wallet associated with another node in decentralized P2P network 270, such as lightweight node computing device 250A, based on fulfillment of programmatic conditions established by a smart contract. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing the smart contract corresponding to smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with the wallet of lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain internodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be timestamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 250B for executing smart contract operation network function request 290. After the new block has been added to blockchain 226, smart contract operation request 290 may be considered to be executed and the data transfer from the wallet associated with lightweight node computing device 250B to the public key associated with the smart contract may be registered.

The smart contract may be configured to hold the data transfer from the wallet associated with lightweight node computing device 250B until fulfillment of certain predetermined criteria hardcoded into the smart contract are achieved. The smart contract may be configured such that it serves as an intermediate arbiter between entities within the decentralized P2P network 270 and may specify details of a dual data transfer between entities.

For example, the smart contract corresponding to smart contract operation request 290 may be one or more algorithms and/or programs stored on a block of blockchain 226. The smart contract may be identified by one or more wallets and/or public keys within decentralized P2P network 270. Lightweight node computing device 250B may transmit smart contract operation network function request 290 to decentralized P2P network 270, which may cause execution of the corresponding smart contract that facilitates a dual data transfer between a wallet associated with lightweight node computing device 250B and a wallet associated with another node in decentralized P2P network 270, such as lightweight node computing device 250A, based on fulfillment of programmatic conditions established by the smart contract. In the processes of adding the block comprising smart contract operation request 290 to blockchain 226, each of full node computing devices 210A-210F may identify the block within blockchain 226 comprising the smart contract, associate the data transfer entailed by smart contract operation request 290 with the smart contract, and execute the one or more algorithms and/or programs of the smart contract. In this instance, given that the smart contract facilitates a dual data transfer and that data transfer has yet to be received from another node (e.g., lightweight node computing device 250A), each of full node computing devices 210A-210F may execute the smart contract without fulfillment of the programmatic conditions established by the smart contract. Accordingly, the funds transferred by lightweight node computing device 250B may remain in the smart contract until the data transfer from the other node is also associated with the smart contract.

Moving forward, lightweight node computing device 250A may also request a smart contract operation related to decentralized P2P network 270, which may conclude the dual data transfer between the wallet associated with lightweight node computing device 250A and the wallet associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract corresponding to the smart contract operation network function request. The smart contract operation network function request may further include the public key associated with the smart contract. Processors of lightweight node computing device 250A may execute digital signature algorithms to digitally sign the smart contract operation network function request with the private key associated with the wallet of lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 250A for executing the smart contract operation network function request. After the new block has been added to blockchain 226, the smart contract operation network function request 290 may be considered to be executed and the data transfer from the wallet associated with lightweight node computing device 250A to the public key associated with the smart contract may be registered.

When the smart contract receives the data value from each of lightweight node computing device 250A and lightweight node computing device 250B, the execution of the smart contract by each of full node computing devices 210A-210F may cause transfer of the data value from lightweight node computing device 250A to lightweight node computing device 250B and the data value from lightweight node computing device 250B to lightweight node computing device 250A.

For example, lightweight node computing device 250A may transmit the smart contract operation network function request to decentralized P2P network 270, which may cause execution of the corresponding smart contract that facilitates the dual data transfer. In the process of adding the block comprising the smart contract operation request provided by lightweight node computing device 250A to blockchain 226, each of full node computing devices 210A-210F may identify the block within blockchain 226 comprising the smart contract, associate the data transfer entailed by smart contract operation request of lightweight node computing device 250A with the smart contract, and execute the one or more algorithms and/or programs of the smart contract. In this instance, given that the smart contract facilitates a dual data transfer and that data transfers have been received from lightweight node computing device 250A and lightweight node computing device 250B, each of full node computing devices 210A-210F may execute the smart contract as fulfillment of the programmatic conditions established by the smart contract has occurred. Accordingly, the funds allocated to the smart contract by each of lightweight node computing device 250A and lightweight node computing device 250B may be respectively distributed to the intended counterparty.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer. Other smart contracts may be included which include algorithms, programs, and/or computer-executable instructions which cause the performance of one or more functions related to at least cryptocurrency, digital content storage and delivery, entity authentication and authorization, digital identity, marketplace creation and operation, internet of things (e.g., IoT), prediction platforms, election voting, medical records, currency exchange and remittance, P2P transfers, ride sharing, gaming, trading platforms, and real estate, precious metal, and work of art registration and transference.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and performance of network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 226 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figures 3A, 3B:
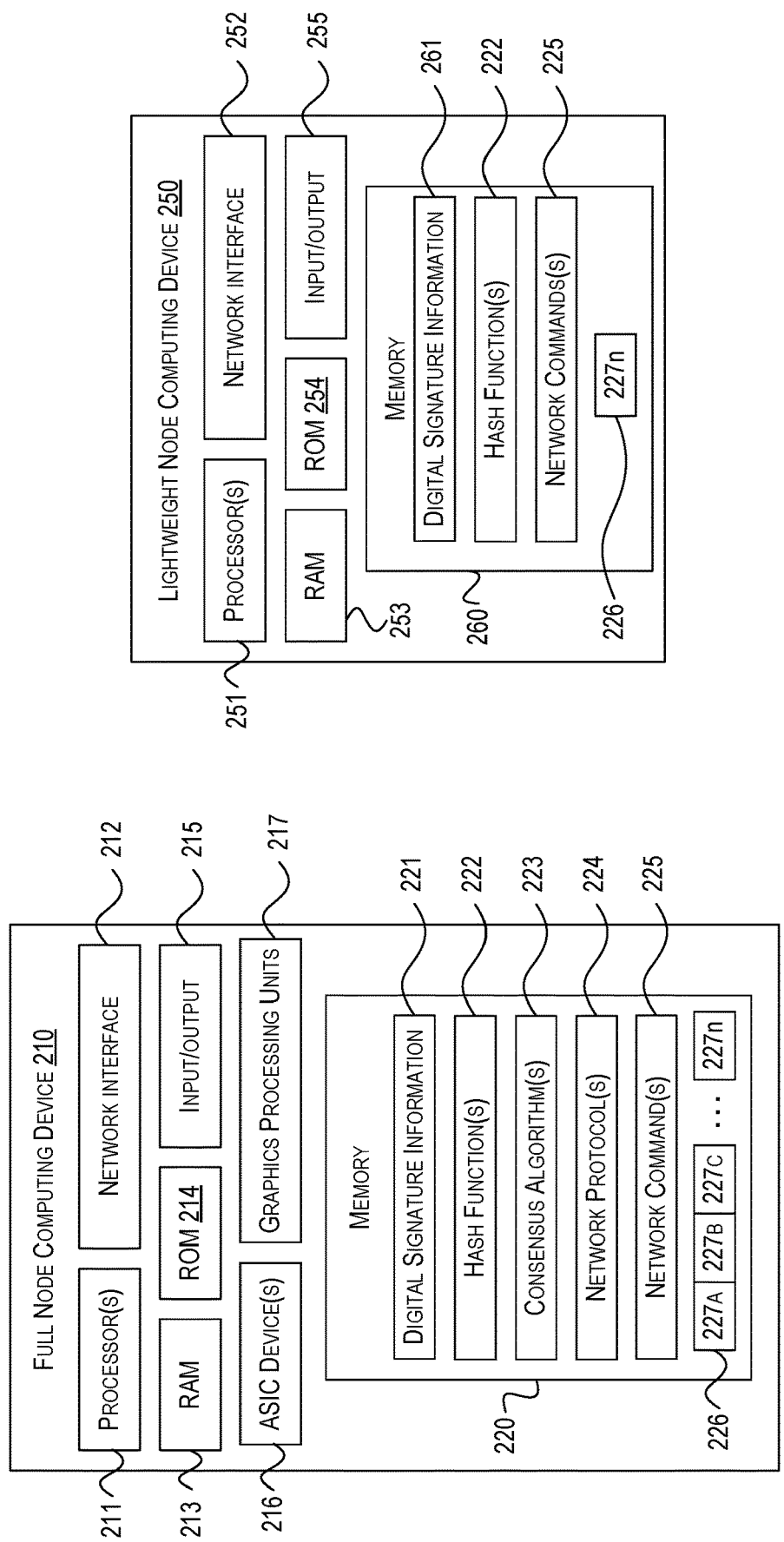
FIG. 3A depicts an illustrative full node computing device that may be used in accordance with one or more example embodiments described herein.
FIG. 3B depicts an illustrative lightweight node computing device that may be used in accordance with one or more example embodiments described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, etc.), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as balance sheet transactions and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized network P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but may be configured with different programs, software, etc.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, etc.), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing support and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such may be the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as balance sheet transactions and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227n, wherein block 227n represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Blockchain-Based Physical Property Management

Figure 4:
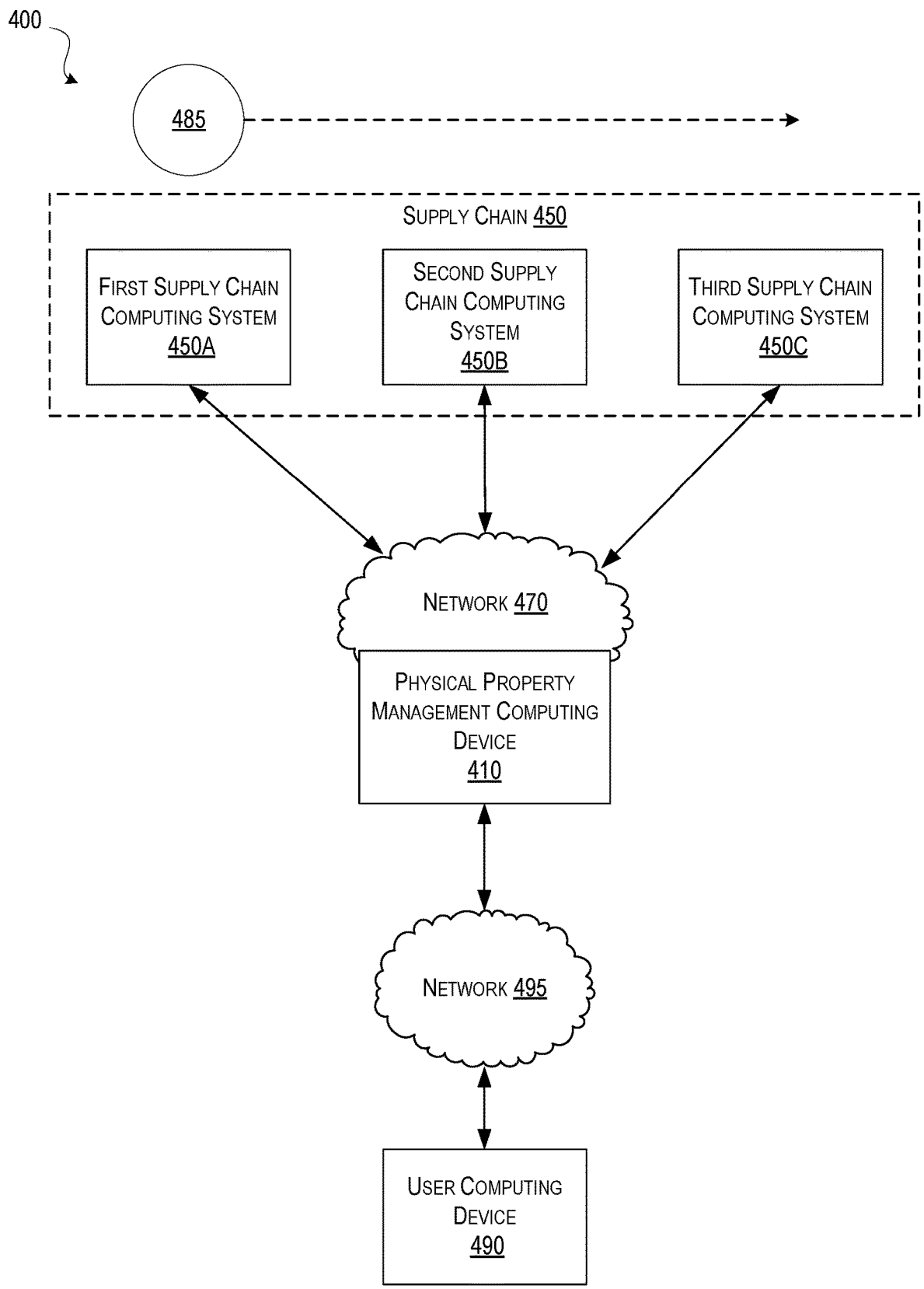
FIG. 4 depicts an illustrative physical property management system that may be used in accordance with one or more example embodiments described herein.

FIG. 4 depicts an illustrative physical property management system 400 that may be used in accordance with one or more example embodiments described herein. Referring to FIG. 4, physical property management system 400 may include at least physical property management computing device 410, supply chain 450 including first supply chain computing system 450A, second supply chain computing system 450B, and third supply chain computing system 450C, decentralized P2P network 470, physical property item 485, user computing device 490, and network 495. Physical property item 485 may be any tangible and/or physical item that may be manufactured, shipped, and sold across supply chain 450. First supply chain computing system 450A, second supply chain computing system 450B, and third supply chain computing system 450C may be respectively associated with different stages (e.g., manufacturing stage, shipment stage, and sale stage) of supply chain 450 related to physical property item 485. Each of first supply chain computing system 450A, second supply chain computing system 450B, and third supply chain computing system 450C may be comprised of a plurality of sensors, scanners, and computing devices which are configured to interface in transmitting network function requests to decentralized P2P network 470. Furthermore, physical property management computing device 410 may be configured to operate on decentralized P2P network 470 and transmit and receive information with user computing device 490 through network 495.

In some instances, physical property management system 400 may include additional computing devices, networks, supply chains, and/or physical property items similar to physical property management computing device 410, supply chain 450, first supply chain computing system 450A, second supply chain computing system 450B, third supply chain computing system 450C, decentralized P2P network 470, physical property item 485, user computing device 490, and network 495. Additionally and/or alternatively, other computing devices, networks, supply chains, and/or physical property items may be included in physical property management system 400. Such additional and/or other computing devices, networks, supply chains, and/or physical property items may be used and/or operate in a similar manner to physical property management computing device 410, supply chain 450, first supply chain computing system 450A, second supply chain computing system 450B, third supply chain computing system 450C, decentralized P2P network 470, physical property item 485, user computing device 490, and network 495 described in regard to physical property management system 400.

Physical property management computing device 410 may be associated with a particular entity, such as company and/or enterprise organization, that serves as a proprietor of supply chain 450 through which physical property item 485 is manufactured, shipped, and sold. In some instances, physical property management computing device 410 may be configured to operate as a full and/or lightweight node computing device in decentralized P2P network 470. As such, physical property management computing device 410 may include at least a portion of a blockchain corresponding to the decentralized P2P network 470 stored in memory which may store information related to physical property item 485 at the various stages (e.g., manufacture stage, shipping stage, and sales stage) of supply chain 450. The information related to physical property item 485 may be received at physical property computing device 410 from first supply chain computing system 450A, second supply chain computing system 450B, and/or third supply chain computing system 450C of supply chain 450, either directly or indirectly, through decentralized P2P network 470. Furthermore, physical property management computing device 410 may be able to transmit and receive information with user computing device 490 through network 495. In some instances, such information may be related to physical property item 485 at the various stages of supply chain 450.

In arrangements in which physical property management computing device 410 operates as a full node in decentralized P2P network 470, physical property management computing device 410 may be similar to full node computing devices 210A-210F described above in regard to FIG. 2, as well as full node computing device 210 described above in regard to FIG. 3A. As such, physical property management computing device 410 may be configured to execute requested network functions, maintain inter-nodal agreement as to the state of the blockchain of decentralized P2P network 470, and request execution of network functions. Such network functions may include data storage operations and/or smart contract operations, which may be related to facilitating the blockchain-based physical property management processes described in further detail below.

In arrangements in which physical property management computing device 410 operates as a lightweight node on decentralized P2P network 470, physical property management computing device 410 may be similar to lightweight node computing devices 250A and 250B described above in regard to FIG. 2, as well as lightweight node computing device 250 described above in regard to FIG. 3B. As a lightweight node computing device, physical property management computing device 410 may be configured to interface with decentralized P2P network 470 by requesting execution of network functions related to facilitating the blockchain-based physical property management processes described herein, as well as storing at least a portion of the blockchain of decentralized P2P network 470.

Supply chain 450 may correspond to an arrangement of resources and/or infrastructure which provide for the manufacture, shipping, and sale of physical property item 485. In particular, supply chain 450 may comprise business resources and/or infrastructure for manufacturing physical property item 485 (e.g., manufacturing facilities, equipment, and personnel), shipment of physical property item (e.g., shipping infrastructure and personnel), and sale of physical property item 485 (e.g., retail property, infrastructure, and personnel). In some instances, supply chain 450 may include first supply chain computing system 450A, second supply chain computing system 450B, and third supply chain computing system 450C.

First supply chain computing system 450A, second supply chain computing system 450B, and third supply chain computing system 450C may be respectively associated with a manufacture stage, shipment stage, and sale stage of supply chain 450 for the manufacture, shipment, and sale of physical property item 485. Each of first supply chain computing system 450A, second supply chain computing system 450B, and third supply chain computing system 450C may be computing systems and may include one or more computing devices which may be any of personal computer(s), server computer(s), hand-held or laptop device(s), multiprocessor system(s), microprocessor-based system(s), set top box(es), programmable consumer electronic device(s), network personal computer(s) (PC), mini-computer(s), mainframe computer(s), distributed computing environment(s), virtual computing environment(s), and the like.

In some instances, each of first supply chain computing system 450A, second supply chain computing system 450B, and third supply chain computing system 450C may additionally comprise one or more sensors including, but not limited to, automotive and/or transportation sensor(s), chemical sensor(s), acoustic/sound and/or vibration sensor(s), proximity and/or presence sensor(s), thermal and/or temperature sensor(s), force and/or level sensor(s), pressure sensor(s), optical and/or light sensor(s), position, angle, and/or displacement sensor(s), subatomic particle sensor(s), fluid and/or flow sensor(s), environment sensor(s), electrical and/or magnetic sensor(s), and so on. Additionally and/or alternatively, each of first supply chain computing system 450A, second supply chain computing system 450B, and third supply chain computing system 450C may comprise one or more scanners including, but not limited to, barcode scanner(s), radio-frequency identification (e.g., RFID) scanner(s), near-field communication (e.g., NFC) scanner(s), credit and/or debit card scanner(s), so on. Such sensors and/or scanners may be used by first supply chain computing system 450A, second supply chain computing system 450B, and third supply chain computing system 450C to track physical property item 485 and monitor environmental data related to physical property item 485 along supply chain 450 from manufacture to sale. Furthermore, the one or more computing devices of first supply chain computing system 450A, second supply chain computing system 450B, and third supply chain computing system 450C may be respectively communicatively coupled to the one or more sensors and/or one or more scanners associated with the corresponding supply chain computing system.

First supply chain computing system 450A, second supply chain computing system 450B, and third supply chain computing system 450C may be configured, at least in part, to transmit network function requests to decentralized P2P network 470 which include information corresponding to the tracking and/or monitoring of environmental data related to physical property item 485. As such, at least a computing device in each of first supply chain computing system 450A, second supply chain computing system 450B, and third supply chain computing system 450C may be configured as a lightweight node computing device in decentralized P2P network 470. In instances in which first supply chain computing system 450A, second supply chain computing system 450B, and third supply chain computing system 450C include a computing device configured as a lightweight node computing device, the computing device may be similar to lightweight node computing devices 250A and 250B described above in regard to FIG. 2, as well as lightweight node computing device 250 described above in regard to FIG. 3B. Such a computing device of first supply chain computing system 450A, second supply chain computing system 450B, and third supply chain computing system 450C may be configured to interface with decentralized P2P network 470 by requesting execution of network functions related to facilitating the blockchain-based physical property management processes described herein, as well storing at least a portion of the blockchain of decentralized P2P network 470. In some instances, first supply chain computing system 450A, second supply chain computing system 450B, and third supply chain computing system 450C may include at least a computing device configured as a full node computing device in decentralized P2P network 470. In such instances, the computing device may be similar to full node computing devices 210A-210F described above in regard to FIG. 2, as well as full node computing device 210 described above in regard to FIG. 3A.

Physical property item 485 may be any tangible and/or physical item that may be manufactured, shipped, and sold across supply chain 450. In some instances, physical property item 485 may be affixed with a barcode, quick response (e.g., QR) code, and/or RFID tag which may be scanned by sensors and/or scanners of first supply chain computing system 450A, second supply chain computing system 450B, and third supply chain computing system 450C as physical property item 485 traverses supply chain 450 of physical property management system 400. In some instances, physical property item 485 may be comprised of a plurality of components and/or materials which also have and/or are associated with barcodes, QR codes, and/or RFID tags. Physical property item 485 may be associated with an identifier, such as a serial number, which may be encoded in the barcode, QR code, and/or RFID tag, for the purposes of identifying physical property item 485.

User computing device 490 may be configured to transmit information to and receive information from physical property management computing device 410, through network 495, related to physical property item 485 and the progression of physical property item 485 through supply chain 450 comprising first supply chain computing system 450A, second supply chain computing system 450B, and third supply chain computing system 450C of property management system 400. As such, user computing device 490 may be associated with a user that has purchased physical property item 485 and/or an entity, such as a company and/or enterprise organization, affiliated with the manufacture, shipment, and/or sale of physical property item 485. User computing device 490 may be any of a personal computer, server computer, hand-held or laptop device, multiprocessor system, microprocessor-based system, set top box, programmable consumer electronic device, network personal computer, minicomputer, mainframe computer, distributed computing environment, virtualized computing environment and the like.

Additionally and/or alternatively, user computing device 490 may be configured to interface with decentralized P2P network 470 in identifying information related to physical property item 485 as it traverses supply chain 450 of physical property management system 400. As such, user computing device 490 may be configured as a lightweight node computing device in decentralized P2P system 470 and may be similar to lightweight node computing devices 250A and 250B described above in regard to FIG. 2, as well as lightweight node computing device 250 described above in regard to FIG. 3B. Alternatively, user computing device 490 may be configured as a full node computing device in decentralized P2P system 470 and may be similar to full node computing devices 210A-210F described above in regard to FIG. 2, as well as full node computing device 210 described above in regard to FIG. 3A.

As stated above, physical property management system 400 may further include decentralized P2P network 470 in which physical property management computing device 410 may be configured to operate as a node. Decentralized P2P network 470 may be similar to decentralized P2P network 270 described above in regard to FIG. 2. As such, decentralized P2P network 470 may be formed by a plurality of full node computing devices executing network protocols associated with decentralized network 470. Furthermore, network functions performed by decentralized network 470 may be configured to be stored by the full node computing devices of decentralized P2P network 470 on a blockchain associated with decentralized P2P network 470.

Additionally, physical property management system 400 may include one or more networks, which may interconnect physical property management computing device 410 and user computing device 490. For example, physical property management system 400 may include network 495. Network 495 may include one or more sub-networks (e.g., local area networks (LANs), wide area networks (WANs), or the like). Each of physical property management computing device 410 and user computing device 490 of physical property management system 400 may be configured to communicate through network 495. In some instances, one or more computing devices of first supply chain computing system 450A, second supply chain computing system 450B, and third supply chain computing system 450C may also be configured to communicate through network 495.

FIGS. 5A-5I depict an illustrative event sequence for physical property management in accordance with one or more example embodiments described herein. While the steps of the event sequence of FIGS. 5A-5I are described in a particular order, it should be understood that the steps may be performed in any order without departing from the scope of the disclosure provided herein. Furthermore, even though the event sequence is described as being performed by a particular arrangement of computing systems, devices, and networks (e.g., physical property management computing device 410, supply chain computing systems 450A, 450B, and 450C, decentralized P2P network 470, and user computing device 490), the processes may be performed by a number of computing systems, devices, and/or computing networks greater or less than that described in regard to FIGS. 5A-5I.

Figure 5A:
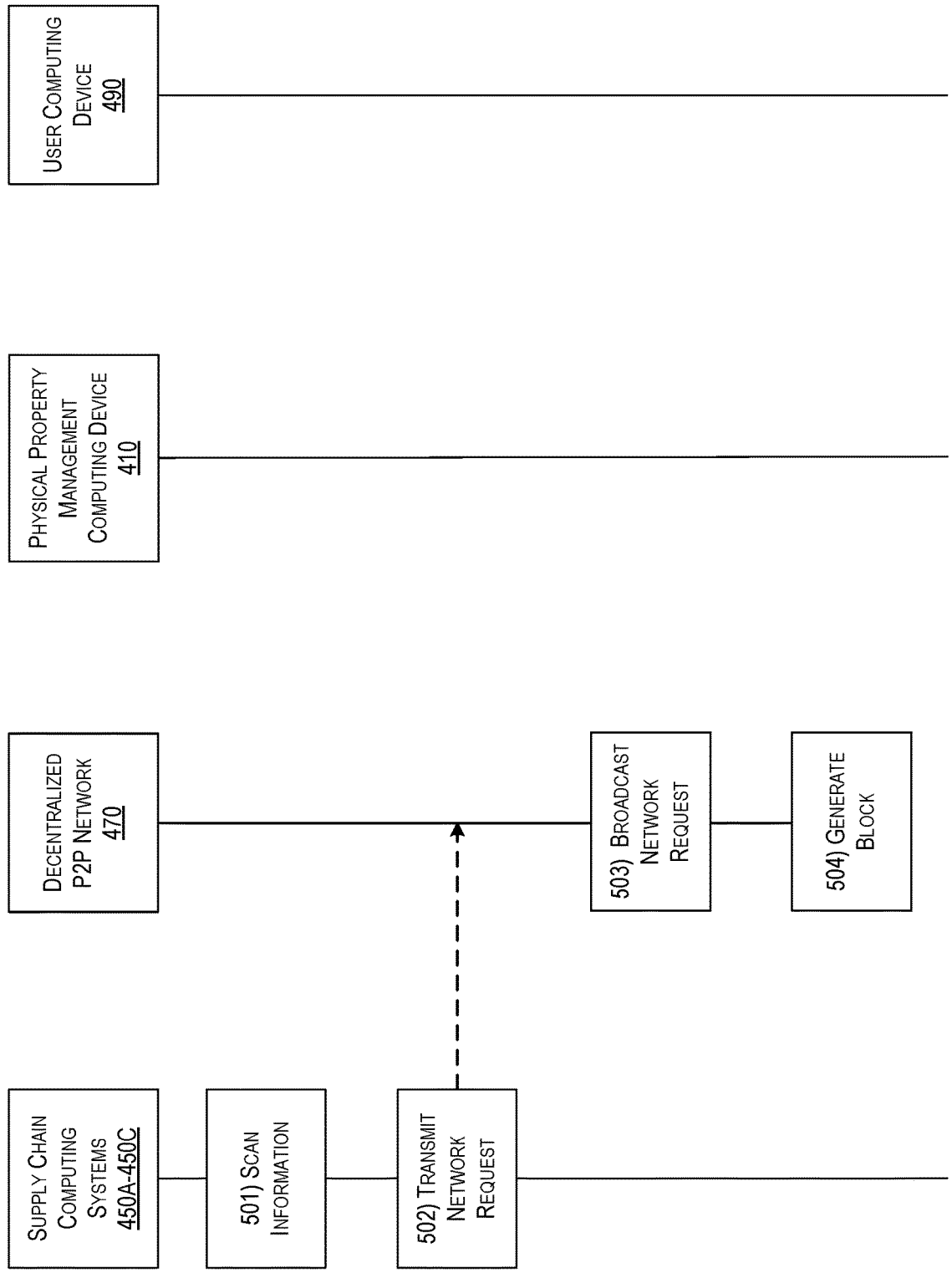

Referring to FIG. 5A, at step 501, one or more scanners of supply chain computing system 450A may scan information corresponding to one or more raw materials and/or products used in the manufacture of physical property item 485. In some instances, the raw materials and/or products associated with physical property item 485 may be affixed with one or more barcodes, QR codes, and/or RFID tags, which encode information corresponding to the raw materials and/or products of physical property item 485. Additionally and/or alternatively, one or more shipment boxes and/or containers comprising the raw materials and/or products of physical property item 485 may be affixed with the one or more barcodes, QR codes, and/or RFID tags. The encoded information scanned by the one or more scanners of supply chain computing system 450A may include details of the raw materials and/or products such as type, quantity, weight, date of production, location of production, serial number, part number, intended usage, and the like. In some instances, the encoded information may further include identifiers, such as serial numbers, for one or more physical product items (e.g., physical product item 485) to be made from the raw materials and/or products.

At step 502, a computing device of supply chain computing system 450A may transmit a network function request to decentralized P2P network 470. The network function request may be a data storage request and may include the information scanned by the one or more scanners of supply chain computing system 450A related to the raw materials and/or products of physical property item 485. Furthermore, the information may include design details related to the physical property item, as well as intellectual property details such as patent number. In some instances, the network function request may further include the identifier corresponding to physical property item 485. The network function request may be transmitted by the computing device of supply chain computing system 450A through execution and/or usage of one or more data items and/or computer-executable instructions of a wallet corresponding to decentralized P2P network 470.

At step 503, decentralized P2P network 470 may receive the network function request from the computing device of supply chain computing system 450A and may broadcast the network function request to each of the full node computing devices comprising decentralized P2P network 470. In some instances, the broadcasting of the network function request may be performed by each of the full node computing devices comprising decentralized P2P network 470 so that each of the full node computing devices receives the network function request.

At step 504, at least one of the full node computing devices of decentralized P2P network 470 may generate a block corresponding to a blockchain of decentralized P2P network 470 and may add the block to the blockchain. In particular, at least one of the full node computing devices comprising decentralized P2P network 470 may perform one or more operations of decentralized P2P network 470 in generating the block and adding the block to the blockchain of decentralized P2P network 470. In arrangements in which physical property management computing device 410 is configured as a full node computing device in decentralized P2P network 470, physical property management computing device 410 may, in some instances, generate the block and add the block to the blockchain of decentralized P2P network 470. The operations of generating and adding the block to the blockchain may be similar to those described above in regard to FIG. 2.

Figure 5B:
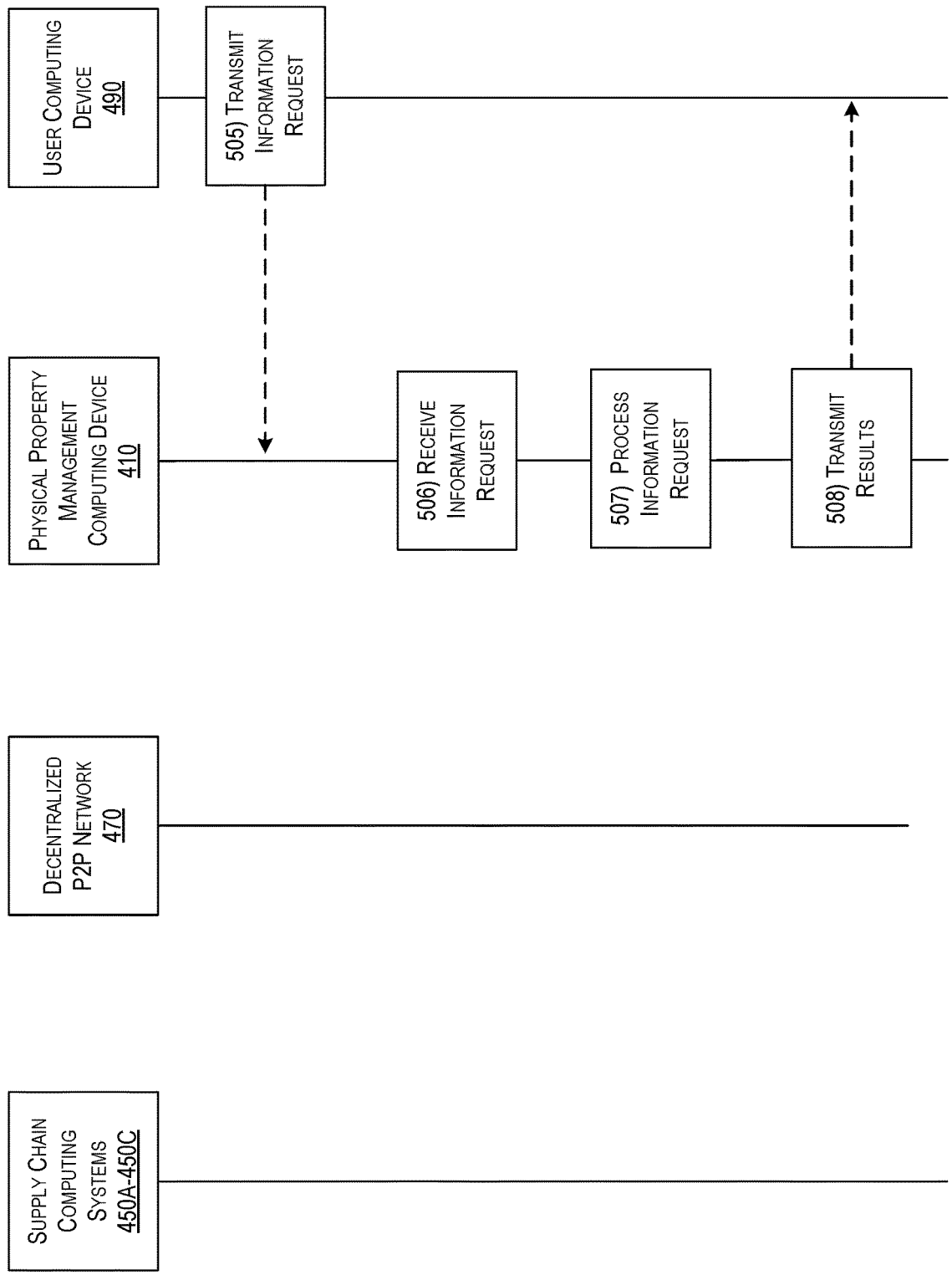

Referring to FIG. 5B, at step 505, user computing device 490 may transmit an information request to physical property management computing device 410 regarding physical property item 485. As stated above, user computing device 490 may be associated with an entity that had purchased physical property item 485. Additionally and/or alternatively, user computing device 490 may be associated with an entity, such as a company and/or enterprise organization, affiliated with the manufacture, shipment, and/or sale of physical property item 485. In some instances, the information request provided by user computing device 490 may include the identifier corresponding to physical property item 485.

At step 506, physical property management computing device 410 may receive the information request from user computing device 490. At step 507, physical property management computing device 410 may process the information request received from user computing device 490. In doing so, physical property management computing device 410 may search the blockchain stored in memory corresponding to decentralized P2P network 470, based on the identifier corresponding to physical property item 485. Physical property management computing device 410 may identify a block comprising the identifier of physical property item 485 and any related information to physical property item 485. In this instance, physical property management computing device 410 may identify at least one block within the blockchain of decentralized P2P network 470 which comprises information related to the one or more raw materials and/or products to be used in the manufacture of physical property item 485. At step 508, physical property management computing device 410 may transmit results to the information request to user computing device 490. Such information may be similar to that identified at step 507.

Figure 5C:
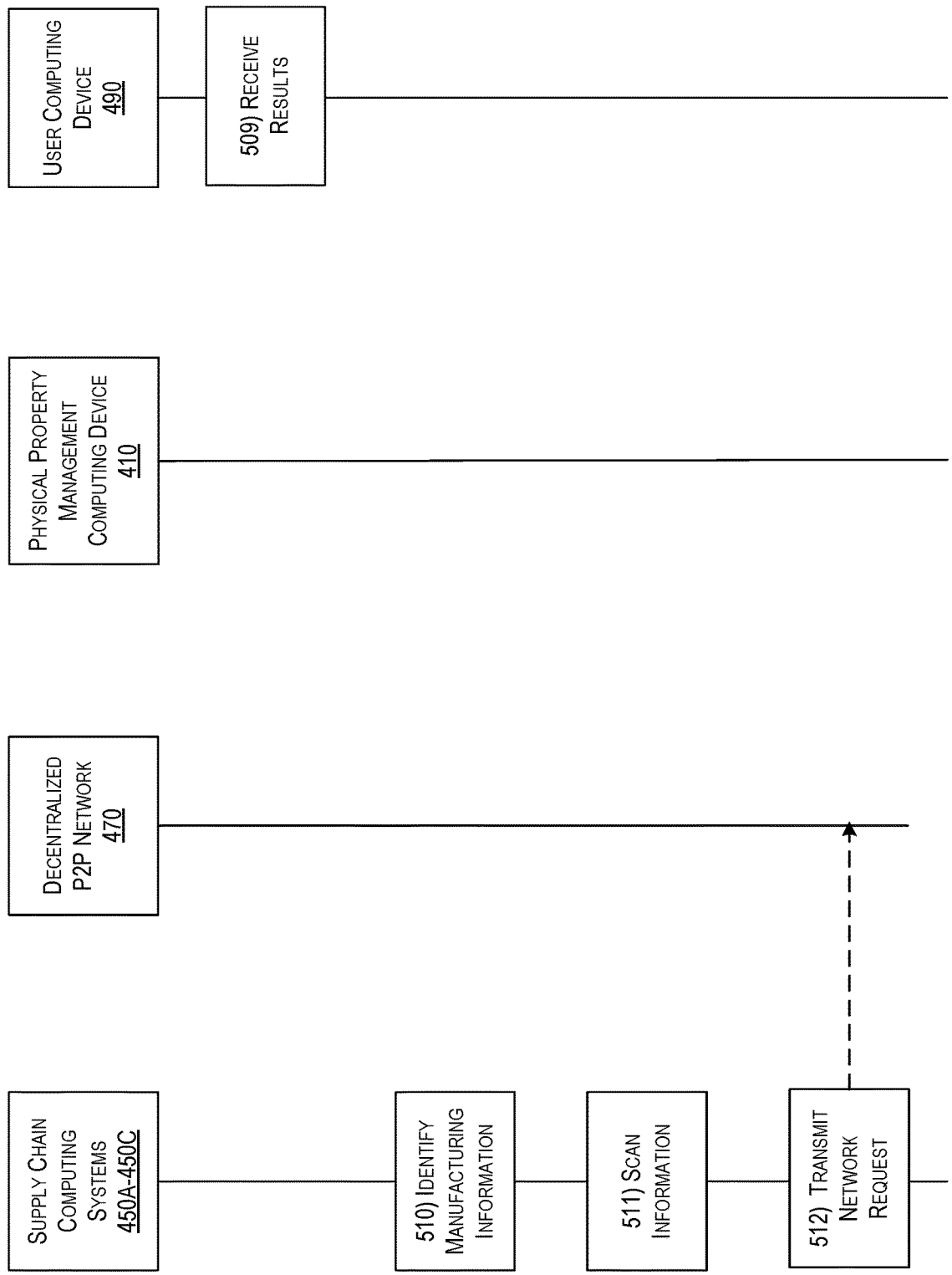

Referring to FIG. 5C, at step 509, user computing device 490 may receive the results of the information request from property management computing device 410. In arrangements in which user computing device 490 is configured as a node within decentralized P2P network 470, however, steps 505-509 may be omitted. Instead, user computing device 490 may perform the processes outlined in steps 505-509 with and/or without interaction with physical property management computing device 410.

At step 510, one or more sensors of supply chain computing system 450A may detect information corresponding to the manufacture of the one or more raw materials and/or products associated with physical property item 485 into physical property item 485. Such information may relate to critical parameters for the manufacture of physical property item 485 and may vary depending on the product corresponding to physical property item 485. For example, in the event that physical property item 485 is a milk carton, the detected information may relate to a temperature of the milk, chemical composition of the milk, pH of the milk, pasteurization information corresponding to the milk, and so on. In the event that physical property item 485 is a computing device, the detected information may relate to temperature and/or humidity of the manufacturing facility in which physical property item 485 is manufactured, static electrical charge of the manufacturing facility in which physical property item 485 is manufactured, and so on.

Additionally and/or alternatively, the detected information may relate to required parameters determined by government regulations and/or certification standards related to the manufacture of physical property item 485. Such information may relate to workplace conditions for manufacturing laborers and/or manufacturing parameters on a product-by-product basis. For example, in the event that physical property item 485 is a sterile medical product, the detected information may correspond to current good manufacturing practice (e.g., CGMP) regulations.

At step 511, one or more scanners of supply chain computing system 450A may scan information corresponding to physical property item 485 upon manufacturing completion. In doing so, supply chain computing system 450C may associate the manufacturing information identified at step 510 with physical property item 485. As stated above, the physical property item 485 may be affixed with one or more barcodes, QR codes, and/or RFID tags. In some instances, the one or more barcodes, QR codes, and/or RFID tags may encode information corresponding to the raw materials and/or products used in the manufacture of physical property item 485. Additionally and/or alternatively, the one or more barcodes, QR codes, and/or RFID tags of physical property item 485 may encode the manufacturing information identified at step 510. In some instances, the encoded information may further include the identifier for physical property item 485.

At step 512, a computing device of supply chain computing system 450A may transmit a network function request to decentralized P2P network 470. The network function request may be a data storage request and may include the information scanned by the one or more scanners of supply chain computing system 450A related to physical property item 485 such as the information corresponding to the raw materials and/or products used in the manufacture of physical property item 485 and/or the manufacturing information identified at step 510. The network function request may further include the identifier of physical property item 485. In some instances, the computing device of supply chain computing system 450A may transmit a plurality of network function requests to decentralized P2P network 470 including at least a first network function request which includes the information corresponding to the raw materials and/or products used in the manufacture of physical property item 485 and a second network function request which includes the information corresponding to the manufacturing information identified at step 510. The network function requests and/or requests may be transmitted by the computing device of supply chain computing system 450A through execution and/or usage of one or more data items and/or computer-executable instructions associated with a wallet of the computing device of supply chain computing system 450A corresponding to decentralized P2P network 470.

Figure 5D:
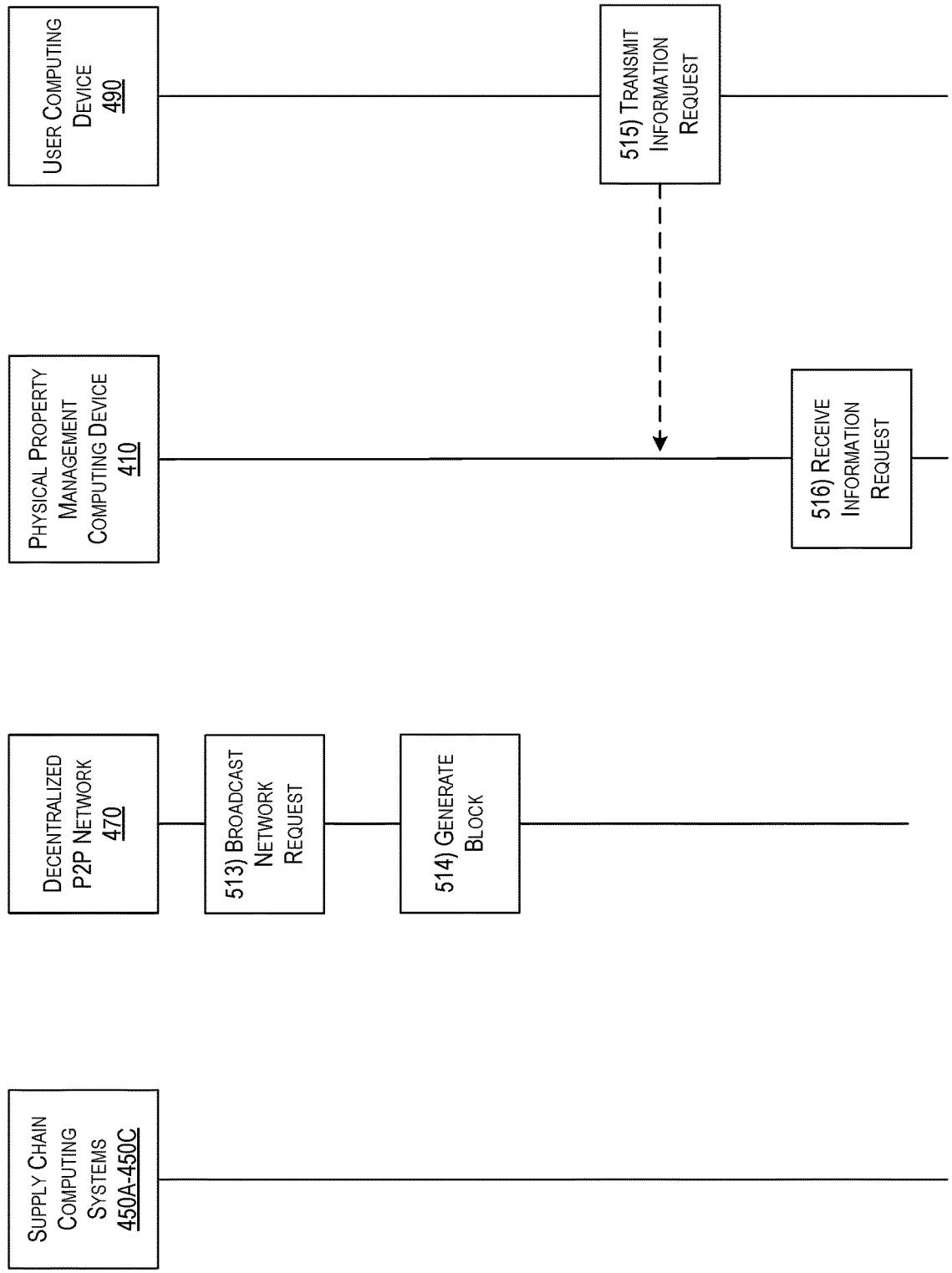

Referring to FIG. 5D, at step 513, decentralized P2P network 470 may receive the network function request from the computing device of supply chain computing system 450A and may broadcast the network function request to each of the full node computing devices of decentralized P2P network 470. In some instances, the broadcasting of the network function request may be performed by each of the full node computing devices comprising decentralized P2P network 470 so that each of the full node computing devices receives the network function request.

At step 514, at least one of the full node computing devices of decentralized P2P network 470 may generate a block corresponding to the blockchain of decentralized P2P network 470 and may add the block to the blockchain. In particular, at least one of the full node computing devices comprising decentralized P2P network 470 may perform one or more operations of decentralized P2P network 470 in generating the block and adding the block to the blockchain of decentralized P2P network 470. In arrangements in which physical property management computing device 410 is configured as a full node computing device in decentralized P2P network 470, physical property management computing device 410 may, in some instances, generate the block and the block to the blockchain of decentralized P2P network 470.

At step 515, user computing device 490 may transmit an information request to physical property management computing device 410 regarding physical property item 485. The information request provided by user computing device 490 may include the identifier corresponding to physical property item 485. At step 516, physical property management computing device 410 may receive the information request from user computing device 490.

Referring to FIG. 5E, at step 517, physical property management computing device 410 may process the information request received from user computing device 490. In doing so, physical property management computing device 410 may search the blockchain stored in memory corresponding to decentralized P2P network 470, based on the identifier corresponding to physical property item 485. Physical property management computing device 410 may identify one or more blocks comprising the identifier of physical property item 485 and any information related to physical property item 485. In this instance, physical property management computing device 410 may identify at least two blocks within the blockchain of decentralized P2P network 470 which respectively comprise information related to the one or more raw materials and/or products used in the manufacture of physical property item 485 and the information related to the manufacture of the one or more raw materials and/or products into physical property item 485.

At step 518, physical property management computing device 410 may transmit results to the information request to user computing device 490. Such information may be similar to that identified at step 507 and 517. At step 519, user computing device 490 may receive the results of the information request from property management computing device 410. In arrangements in which user computing device 490 is configured as a node within decentralized P2P network, however, steps 515-519 may be omitted. Instead, user computing device 490 may perform the processes outlined in steps 515-519 with and/or without interaction with physical property management computing device 410.

At step 520, physical property item 485 may progress to the shipment stage of supply chain 450 and one or more sensors of supply chain computing system 450B may detect information corresponding to the shipment of physical property item 485 from the manufacture stage to the sale stage. Such information may relate to critical parameters for the shipment of physical property item 485 and may vary depending on the product corresponding to physical property item 485. For example, in the event that physical property item 485 is a milk carton, the detected information may relate to a temperature of the shipment infrastructure comprising the milk carton, a time duration from the shipping from the manufacturing facility to the sale facility, and so on. In the event that physical property item 485 is a computing device, the detected information may relate to temperature and/or humidity of the shipment infrastructure in which physical property item 485 is shipped, static electrical charge of the shipment infrastructure in which physical property item 485 is shipped, electromagnetic information related to the shipment infrastructure in which physical property item 485 is shipped, and so on. Additionally and/or alternatively, the detected information may relate to required parameters determined by government regulations and/or certification standards for the shipment of physical property item 485.

Referring to FIG. 5F, at step 521, one or more scanners of supply chain computing system 450B may scan information corresponding to physical property item 485 upon shipment completion and arrival at the sales facility. In doing so, supply chain computing system 450B may associate the shipment information identified at step 520 with physical property item 485. As stated above, the physical property item 485 may be affixed with one or more barcodes, QR codes, and/or RFID tags. In some instances, one or more shipment boxes and/or containers comprising physical property item 485 may be affixed with the one or more barcodes, QR codes, and/or RFID tags, which may be scanned at step 521. The scanning of the one or more barcodes, QR codes, and/or RFID tags of physical property item 485 may associate physical property item 485 with a new stage of supply chain 450.

In some instances, the scanning of the one or more barcodes, QR codes, and/or RFID tags of physical property item 485 may occur upon a shipment transition. For example, scanning may occur when shipment of physical property item 485 changes from a first shipment method to a second shipment method (e.g., from freight shipment to air shipment, from plane shipment to roadway vehicle shipment, and so on). Furthermore, the scanning of the one or more barcodes, QR codes, and/or RFID tags of physical property item 485 may occur during a change between similar shipment methods (e.g., from a first roadway shipment vehicle to a second roadway shipment vehicle, from a first shipment airplane to a second shipment airplane, and so on). Additionally and/or alternatively, the scanning of the one or more barcodes, QR codes, and/or RFID tags of physical property item 485 may occur upon a shipment transition from a shipment method to an intermediary shipment facility (e.g., from a roadway shipment vehicle to a roadway shipment facility, from a shipment airplane to an airplane shipment facility, and so on). In each of such instances, shipping information may be identified in a manner similar to that described above in regard to step 520.

At step 522, a computing device of supply chain computing system 450B may transmit a network function request to decentralized P2P network 470. The network function request may be a data storage request and may include the information scanned by the one or more scanners of supply chain computing system 450B related to locational changes of physical property item 485 and/or the shipment information identified at step 520. The network function request may further include the identifier of physical property item 485. In some instances, the computing device of supply chain computing system 450B may transmit a plurality of network function requests to decentralized P2P network 470 including at least a first network function request which includes the locational information corresponding to physical property item 485 and a second network function request which includes the information corresponding to the shipment information identified at step 520. The network function requests and/or requests may be transmitted by the computing device of supply chain computing system 450B through execution and/or usage of one or more data items and/or computer-executable instructions associated with a wallet of the computing device of supply chain computing system 450B corresponding to decentralized P2P network 470.

At step 523, decentralized P2P network 470 may receive the network function request from the computing device of supply chain computing system 450B and may broadcast the network function request to each of the full node computing devices in decentralized P2P network 470. In some instances, the broadcasting of the network function request may be performed by each of the full node computing devices comprising decentralized P2P network 470 so that each of the full node computing devices receives the network function request.

At step 524, at least one of the full node computing devices of decentralized P2P network 470 may generate a block corresponding to the blockchain of decentralized P2P network 470 and may add the block to the blockchain. In particular, at least one of the full node computing devices comprising decentralized P2P network 470 may perform one or more operations of decentralized P2P network 470 in generating the block and adding the block to the blockchain of decentralized P2P network 470. In arrangements in which physical property management computing device 410 is configured as a full node computing device in decentralized P2P network 470, physical property management computing device 410 may, in some instances, generate the block and the block to the blockchain of decentralized P2P network 470.

Figure 5G:
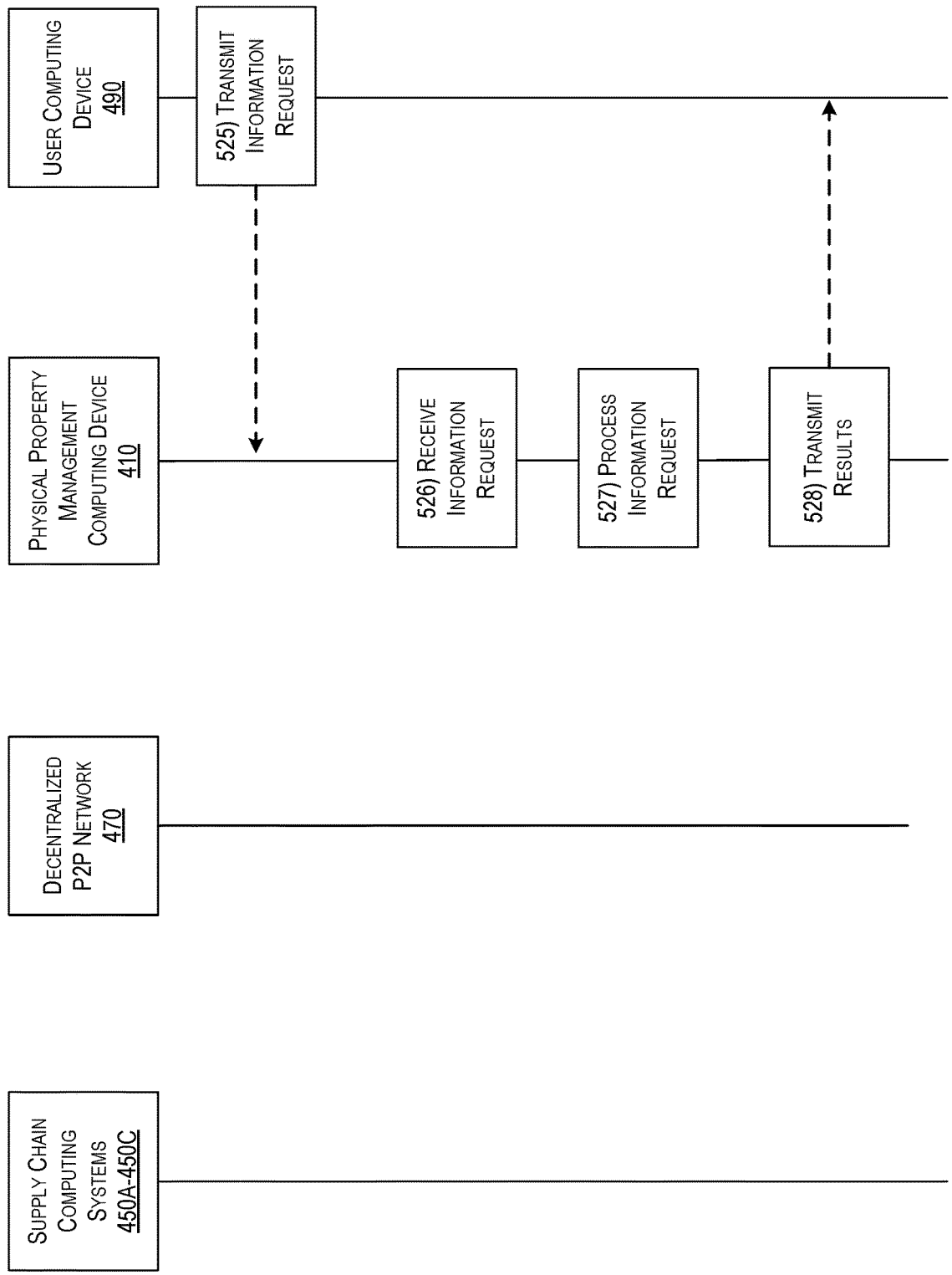

Referring to FIG. 5G, at step 525, user computing device 490 may transmit an information request to physical property management computing device 410 regarding physical property item 485. The information request provided by user computing device 490 may include the identifier corresponding to physical property item 485. At step 526, physical property management computing device 410 may receive the information request from user computing device 490.

At step 527, physical property management computing device 410 may process the information request received from user computing device 490. In doing so, physical property management computing device 410 may search the blockchain stored in memory corresponding to decentralized P2P network 470, based on the identifier of physical property item 485. Physical property management computing device 410 may identify one or more blocks comprising the identifier of physical property item 485 and any information related to physical property item 485. In this instance, physical property management computing device 410 may identify at least three blocks within the blockchain of decentralized P2P network 470 which may respectively comprise the information related to the one or more raw materials and/or products used in the manufacture of physical property item 485, the information related to the manufacture of the one or more raw materials and/or products into physical property item 485, and the information related to the shipment of physical property item 485. At step 528, physical property management computing device 410 may transmit results to the information request to user computing device 490. Such information may be similar to that identified at 527.

Figure 5H:
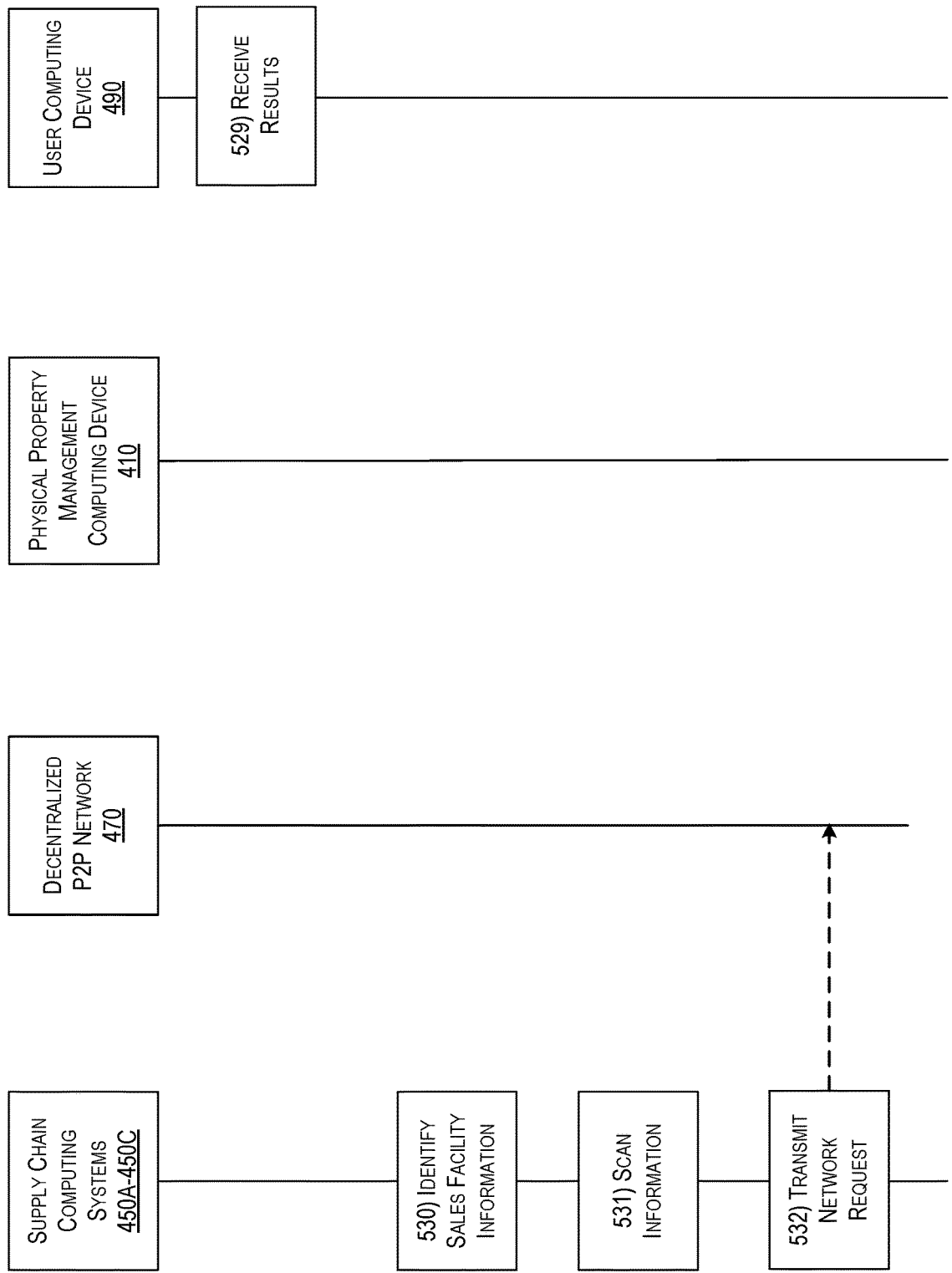
Figure 5I:
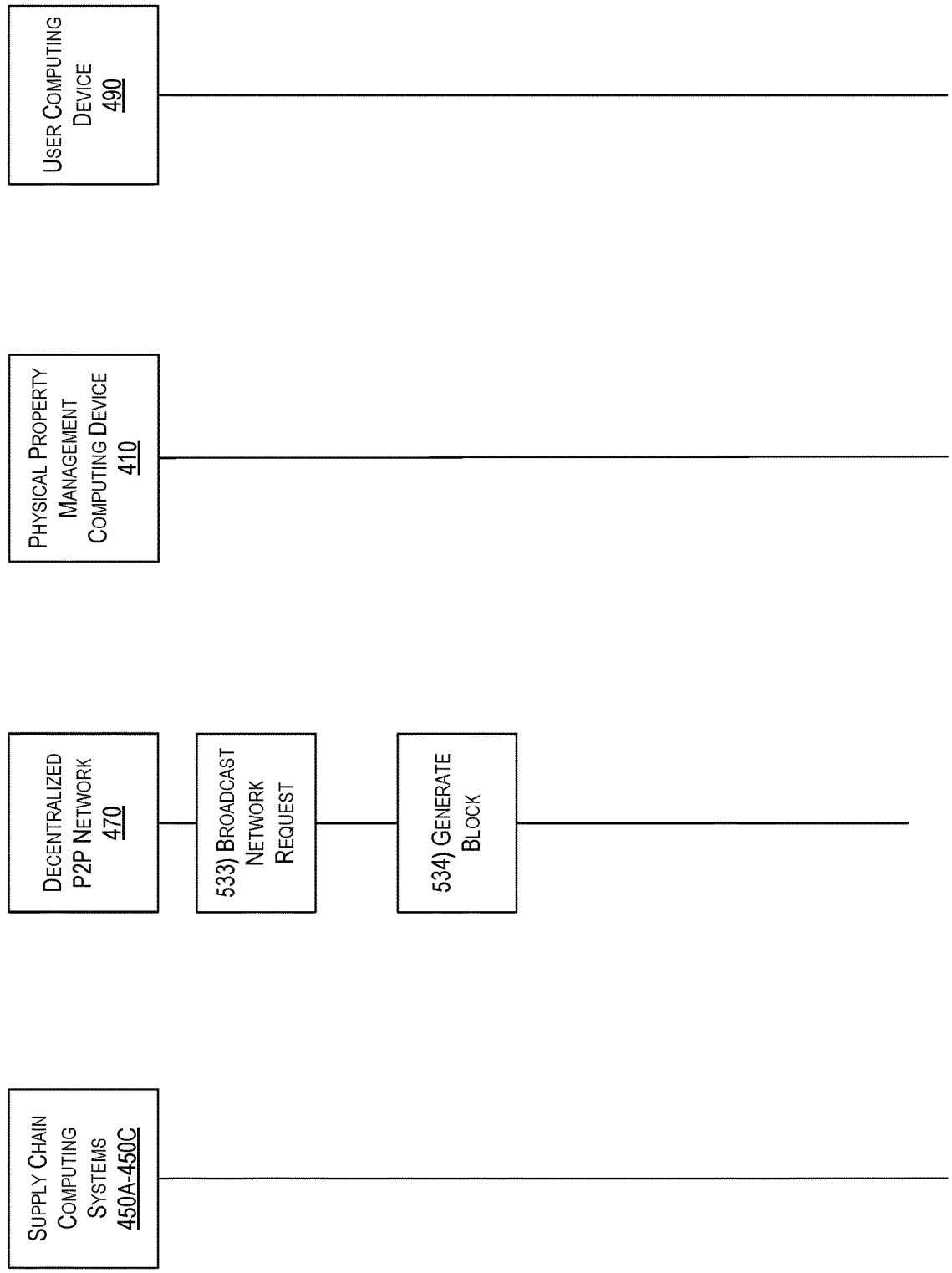

Referring to FIG. 5H, at step 529, user computing device 490 may receive the results of the information request from property management computing device 410. In arrangements in which user computing device 490 is configured as a node within decentralized P2P network, however, steps 525-529 may be omitted. Instead, user computing device 490 may perform the processes outlined in steps 525-529 with and/or without interaction with physical property management computing device 410.

At step 530, physical property item 485 may progress to the sale stage of supply chain 450 and one or more sensors of supply chain computing system 450C may detect information corresponding to the sales facility of physical property item 485. Such information may relate to critical parameters for the storage and/or sale of physical property item 485 and may vary depending on the product corresponding to physical property item 485. For example, in the event that physical property item 485 is a milk carton, the detected information may relate to a temperature of the sales infrastructure storing the milk carton, a time duration in the sales facility to the point of sale, and so on. In the event that physical property item 485 is a computing device, the detected information may relate to temperature and/or humidity of the sales facility, static electrical charge of the sales facility, electromagnetic information related to the sales facility, and so on. Additionally and/or alternatively, the detected information may relate to required parameters determined by government regulations and/or certification standards for the storage of physical property item 485.

At step 531, one or more scanners of supply chain computing system 450C may scan information corresponding to physical property item 485 upon the sale of physical property item 485. In doing so, supply chain computing system 450C may associate the sales information identified at step 530 with physical property item 485. As stated above, one or more shipment boxes and/or containers comprising physical property item 485 may be affixed with the one or more barcodes, QR codes, and/or RFID tags, which may be scanned at step 531. The scanning of the one or more barcodes, QR codes, and/or RFID tags of physical property item 485 may associate physical property item 485 with a departure from supply chain 450. In some instances, the scanning of the one or more barcodes, QR codes, and/or RFID tags of physical property item 485 may associate the sales facility and/or sales information identified at step 530 with physical property item 485.

At step 532, a computing device of supply chain computing system 450C may transmit a network function request to decentralized P2P network 470. The network function request may be a data storage request and may include the information scanned by the one or more scanners of supply chain computing system 450C related to the departure of physical property item 485 from supply chain 450 and/or the sales facility and/or sales information identified at step 530. The network function request may further include the serial number of physical property item 485. In some instances, the computing device of supply chain computing system 450C may transmit a plurality of network function requests to decentralized P2P network 470 including at least a first network function request which includes the sales information corresponding to physical property item 485 and a second network function request which includes the information corresponding to the sales facility identified at step 530. The network function requests and/or requests may be transmitted by the computing device of supply chain computing system 450C through execution and/or usage of one or more data items and/or computer-executable instructions associated with a wallet of the computing device of supply chain computing system 450C corresponding to decentralized P2P network 470.

Referring to FIG. 5D, at step 533, decentralized P2P network 470 may receive the network function request from the computing device of supply chain computing system 450C and may broadcast the network function request to each of the full node computing devices of decentralized P2P network 470. In some instances, the broadcasting of the network function request may be performed by each of the full node computing devices comprising decentralized P2P network 470 so that each of the full node computing devices receives the network function request.

At step 534, at least one of the full node computing devices of decentralized P2P network 470 may generate a block corresponding to the blockchain of decentralized P2P network 470 and may add the block to the blockchain. In particular, at least one of the full node computing devices comprising decentralized P2P network 470 may perform one or more operations of decentralized P2P network 470 in generating the block and adding the block to the blockchain of decentralized P2P network 470. In arrangements in which physical property management computing device 410 is configured as a full node computing device in decentralized P2P network 470, physical property management computing device 410 may, in some instances, generate the block and the block to the blockchain of decentralized P2P network 470.

Figure 6:
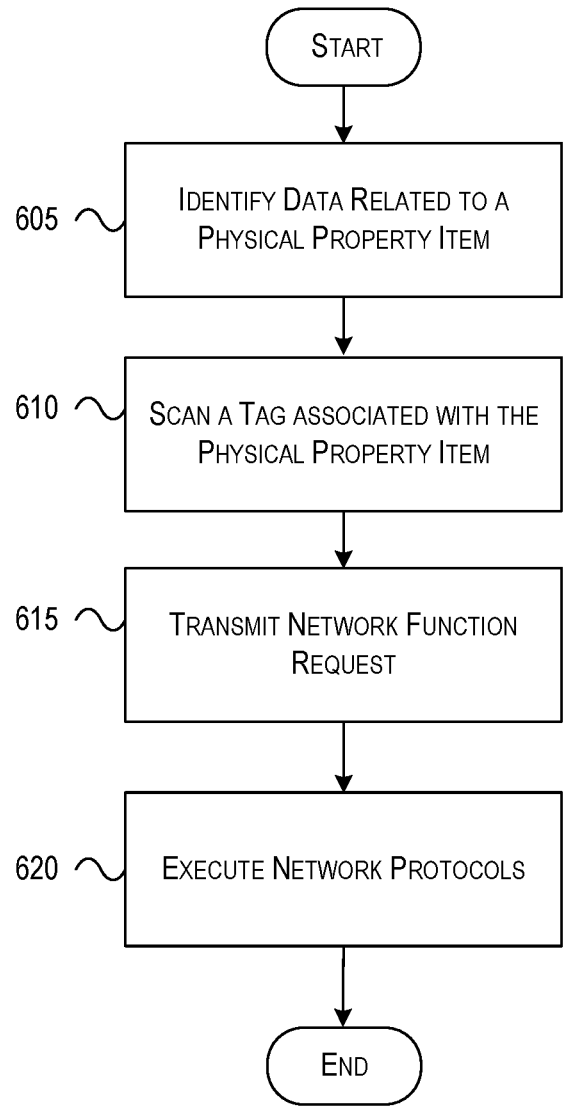
FIG. 6 depicts an illustrative method for physical property management in accordance with one or more example embodiments described herein.

FIG. 6 depicts an illustrative method for physical property management in accordance with one or more example embodiments described herein. Referring to FIG. 6, at step 605, a system may comprise a computing system including one or more sensors, one or more scanners, and at least a computing device configured to identify, by the one or more sensors of the computing system, data related to a physical property item. At step 610, the computing device may scan, by the one or more scanners of the computing system, a tag associated with the physical property item to associate the identified data with the physical property item. At step 615, the computing device may transmit a network function request to a decentralized P2P network, the network function request including the identified data. At step 620, the decentralized P2P network of the system may execute one or more network protocols, at one or more nodes of the decentralized P2P network, to generate a block of a blockchain, the block comprising the network function request.

Through the processes described in the event sequence of FIGS. 5A-5I and method of FIG. 6, in the event that a physical property item is tampered with at any point along a supply chain, information related to the tampering may be immutably stored on a blockchain of a decentralized P2P network. In this way, information related to the physical property item may be preserved as the physical property item traverses the supply chain.

Blockchain-Based Digital Property Management

Figure 7:
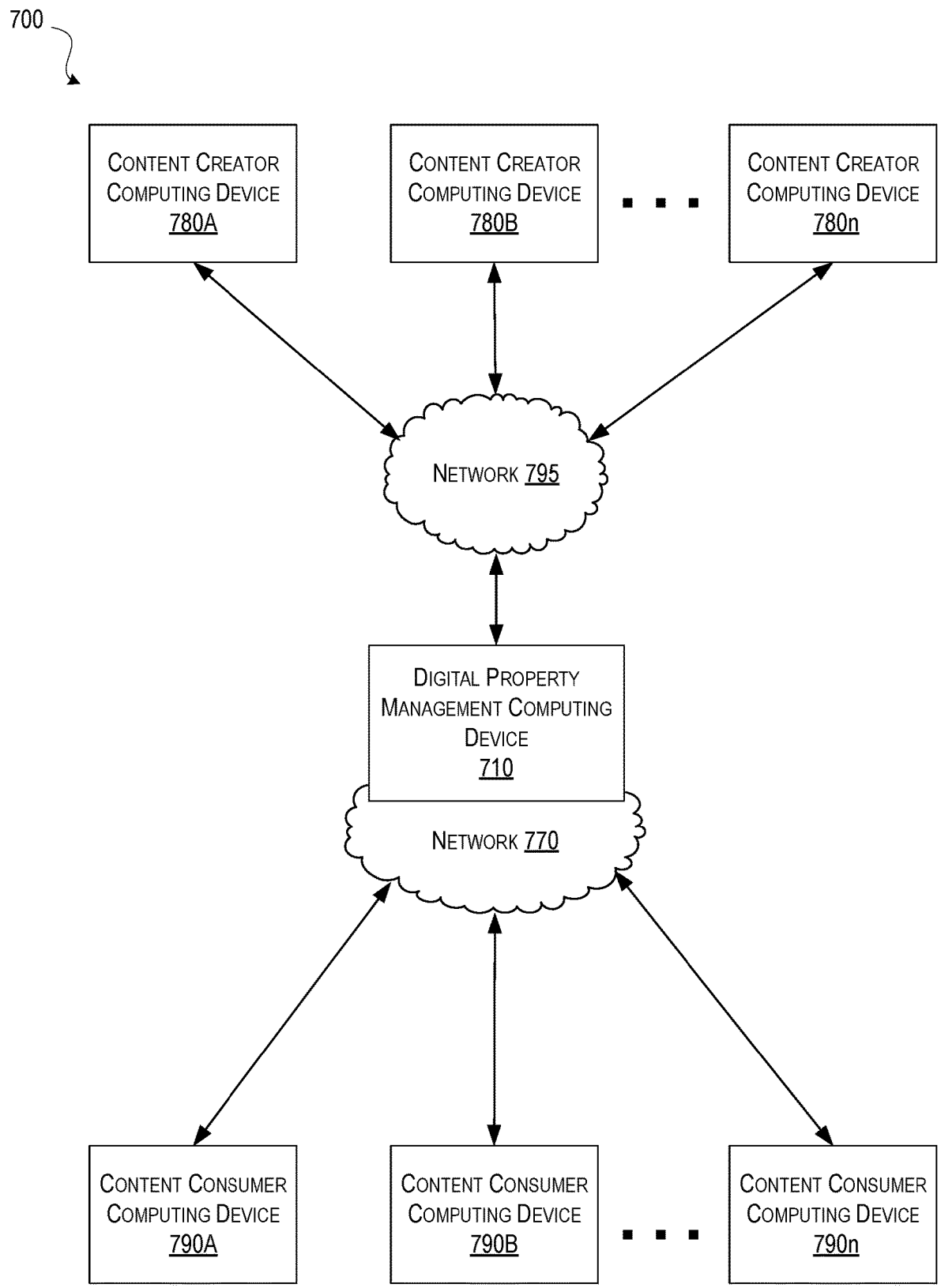
FIG. 7 depicts an illustrative digital property management system that may be used in accordance with one or more example embodiments described herein.

FIG. 7 depicts an illustrative digital property management system 700 that may be used in accordance with one or more example embodiments described herein. Referring to FIG. 7, digital property management system 700 may include at least digital property management computing device 710, decentralized P2P network 770, content creator computing devices 780A-780n, content consumer computing devices 790A-790n, and network 795. Digital property management computing device 710 may be configured to operate as a node in decentralized P2P network 770 and may also interface with network 795. Content creator computing devices 780A-780n may be configured to communicate with digital property management computing device 710 through network 795. Content creator computing devices 790A-790n may be configured to interface with decentralized P2P network 770. In some instances, digital property management system 700 may include additional computing devices and/or networks similar to digital property management computing device 710, decentralized P2P network 770, content creator computing devices 780A-780n, content consumer computing devices 790A-790n, and network 795. Additionally and/or alternatively, other computing devices and/or networks may be included in digital property management system 700. Such additional and/or other computing devices and/or networks may be used and/or operate in a similar manner to digital property management computing device 710, decentralized P2P network 770, content creator computing devices 780A-780n, content consumer computing devices 790A-790n, and network 795 described in regard to digital property management system 700.

Digital property management computing device 710 may be associated with a particular entity, such as company and/or enterprise organization, and may be configured to operate as a full and/or lightweight node computing device in decentralized P2P network 770, which may be a public or private decentralized network. As such, digital property management computing device 710 may include at least a portion of a blockchain, which may be either private or public, corresponding to decentralized P2P network 770 stored in memory. The blockchain corresponding to decentralized P2P network 770 may store information related to the network functions of decentralized P2P network 770, as well as digital property items provided by one or more content creator computing devices 780A-780n, as will be described in further detail below. Such digital property items may include one or more of song(s), movie(s), e-book(s), painting(s), patent(s), digital design(s) and graphic(s), copyright(s), computer-aided drafting (e.g., CAD) drawings, and/or other form of intellectual property.

In arrangements in which digital property management computing device 710 operates as a full node in decentralized P2P network 770, digital property management computing device 710 may be similar to full node computing devices 210A-210F described above in regard to FIG. 2, as well as full node computing device 210 described above in regard to FIG. 3A. As such, digital property management computing device 710 may be configured to execute requested network functions, maintain inter-nodal agreement as to the state of the blockchain of decentralized P2P network 770, and request execution of network functions. Such network functions may include data storage operations and/or smart contract operations, which may be related to facilitating the blockchain-based digital property management processes described in further detail below.

In arrangements in which digital property management computing device 710 operates as a lightweight node on decentralized P2P network 770, digital property management computing device 710 may be similar to lightweight node computing devices 250A and 250B described above in regard to FIG. 2, as well as lightweight node computing device 250 described above in regard to FIG. 3B. As a lightweight node computing device, digital property management computing device 710 may be configured to interface with decentralized P2P network 770 by requesting execution of network functions related to facilitating the blockchain-based digital property management processes described herein.

Digital property management computing device 710 may be configured to interface with content creator computing devices 780A-780n through network 795. As such, digital property management computing device 710 may be configured to transmit information to and receive information from content creator computing devices 780A-780n. For example, digital property management computing device 710 may be configured to receive digital property items from content creator computing devices 780A-780n. Communications between digital property management computing device 710 and content creator computing devices 780A-780n may involve additional information as will be described in further detail below.

According to one or more of the blockchain-based digital property management processes described herein, digital property management computing device 710 may be configured to receive digital property items from content creator computing devices 780A-780n and create smart contracts comprising the digital property items which may facilitate access to the digital property items. Digital property management computing device 710 may be configured to execute one or more network protocols associated with decentralized P2P network 770 to deploy the smart contracts comprising the digital property items on the blockchain of decentralized P2P network 770. Furthermore, digital property management computing device 710 may be configured to execute digital property item access requests from content consumer computing devices 790A-790n which may enable the download, consumption, and/or usage of the digital property items stored in the smart contracts. In some instances, the execution of the digital property item access requests by digital property management computing device 710 may occur through decentralized P2P network 770. In such instances, the digital property item access requests may be provided by content consumer computing devices 790A-790n to decentralized P2P network 770 and digital property management computing device 710 may execute and/or facilitate the digital property item access requests as participating node of decentralized P2P network 770.

Content creator computing devices 780A-780n may be respectively associated with musicians, film makers, artists, writers, inventors, and the like and may include any of any of personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), virtual computing environment(s), and the like. Content creator computing devices 780A-780n may be configured to interface with digital property management computing device 710 through network 795. In some instances, content creator computing devices 780A-780n may be configured to transmit digital property item upload requests to digital property management computing device 710, which may include digital property items.

Additionally and/or alternatively, content creator computing devices 780A-780n may be configured to generate smart contracts which include the digital property items and execute one or more network protocols corresponding to decentralized P2P network 770 to store the smart contracts on the blockchain of decentralized P2P network 770. In such instances, content creator computing devices 780A-780n may be configured as full node computing devices of decentralized P2P network 770, similar to full node computing devices 210A-210F described above in regard to FIG. 2 and full node computing device 210 described above in regard to FIG. 3A, or lightweight node computing devices of decentralized P2P network 770, similar to lightweight node computing devices 250A and 250B described above in regard to FIG. 2 and lightweight node computing device 250 described above in regard to FIG. 3B. In some instances, each of content creator computing devices 780A-780n may be associated with a digital wallet configured to receive fees provided by content consumer computing devices 790A-790n in return for accessing digital property items stored in smart contracts, as will be described below.

Content consumer computing devices 790A-790n may be associated with consumers of works (e.g., digital property items) produced by musicians, film makers, artists, writers, inventors, and the like and may include any of any of personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), virtual computing environment(s), and the like. Content consumer computing devices 790A-790n may be configured to interface with decentralized P2P network 770. In particular, content consumer computing devices 790A-790n may be configured to transmit digital property item access requests (e.g., smart contract operations requests) to decentralized P2P network 770 in order to download, consume, and/or use the digital property items stored in the smart contracts of decentralized P2P network 770. As such, content consumer computing devices 790A-790n may be configured as full node computing devices of decentralized P2P network 770, similar to full node computing devices 210A-210F described above in regard to FIG. 2 and full node computing device 210 described above in regard to FIG. 3A, or lightweight node computing devices of decentralized P2P network 770, similar to lightweight node computing devices 250A and 250B described above in regard to FIG. 2 and lightweight node computing device 250 described above in regard to FIG. 3B. In some instances, each of content consumer computing devices 790A-790n may be associated with a digital wallet configured to transmit fees to content creator computing devices 780A-780n in return for accessing digital property items stored in smart contracts, as will be described below.

As stated above, digital property management system 700 may further include decentralized P2P network 770 in which digital property management computing device 710 may be configured to operate as a node. Decentralized P2P network 770 may be similar to decentralized P2P network 270 described above in regard to FIG. 2. As such, decentralized P2P network 770 may be formed by a plurality of full node computing devices executing network protocols associated with decentralized network 770. Furthermore, network functions performed by decentralized network 770 may be configured to be stored by the full node computing devices of decentralized P2P network 770 on a blockchain associated with decentralized P2P network 770.

Additionally, digital property management system 700 may include one or more networks, which may interconnect digital property management computing device 710, content creator computing devices 780A-780n, and content consumer computing devices 790A-790n. For example, digital property management system 700 may include network 795. Network 795 may include one or more sub-networks (e.g., local area networks (LANs), wide area networks (WANs), or the like). Each of digital property management computing device 710, content creator computing devices 780A-780n, and content consumer computing devices 790A-790n of digital property management system 700 may be configured to communicate through network 795.

FIGS. 8A-8D depict an illustrative event sequence for digital property management in accordance with one or more example embodiments described herein. While the steps of the event sequence of FIGS. 8A-8D are described in a particular order, it should be understood that the steps may be performed in any order without departing from the scope of the disclosure provided herein. Furthermore, even though the event sequence is described as being performed by a particular arrangement of computing systems, devices, and networks (e.g., digital property management computing device 710, decentralized P2P network 770, content creator computing devices 780A-780n, content consumer computing devices 790A-790n, and network 795), the processes may be performed by a number of computing systems, devices, and/or computing networks greater or less than that described in regard to FIGS. 8A-8D.

Figure 8A:
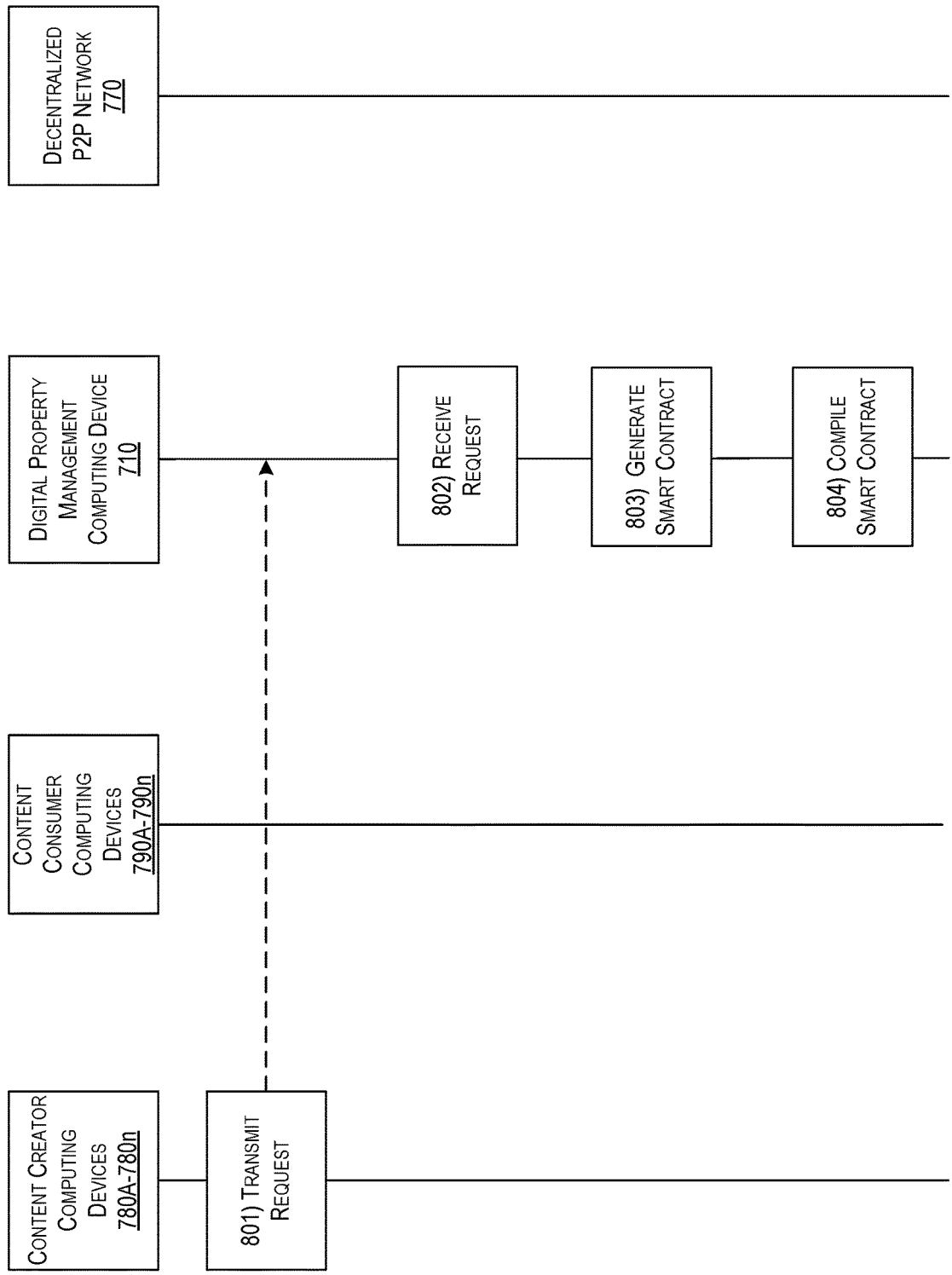
FIGS. 8A-8D an illustrative event sequence for digital property management in accordance with one or more example embodiments described herein.

Referring to FIG. 8A, at step 801, at least one of content creator computing devices 780A-780*n* may transmit a digital property item upload request to digital property management computing device 710. In some arrangements, the digital property item upload request may be provided through an application, operating locally on the at least one of content creator computing devices 780A-780*n*, which may interface with digital property management computing device 710. In other arrangements, the digital property item upload request may be provided by the at least one of content creator computing devices 780A-780*n* through a web interface associated with digital property management computing device 710.

The digital property item upload request may include a digital property item, such as a song, movie, e-book, work of art, patent, design, copyright, and/or other form of intellectual property, and wallet information (e.g., public key) associated with a user of one of content creator computing devices 780A-780*n* who created the digital property item. Furthermore, the digital property item upload request may include fee and/or cost information to be incurred by content consumer computing devices 790A-790*n* responsive to accessing the digital property item. In some instances, a plurality of users may be the responsible for the creation of the digital property item and, as such, wallet information corresponding to each of the plurality of users responsible for the creation may be provided. Additionally and/or alternatively, in instances in which a plurality of users are responsible for the creation of the digital property item, the digital property item upload request may further include a creation responsibility percentage corresponding to each of the plurality of users. As will be described in further detail below, the creation responsibility percentage may determine royalty payments responsive to the download, consumption, and/or usage of the digital property item.

At step 802, digital property management computing device 710 may receive the digital property item upload request from the at least one of content creator computing devices 780A-780*n*. At step 803, digital property management computing device 710 may generate a smart contract specific to the digital property item upload request provided by the at least one of content creator computing devices 780A-780*n*. The smart contract may comprise one or more algorithms and/or computer-executable functions which control one or more of downloading of the digital property item and one time usage and/or consumption of the digital property item by one or more of content consumer computing devices 790A-790*n*. In some instances, the smart contract may further control royalty, fee, and/or price payments to the wallet associated with the user(s) responsible for the creation of the digital property item. At step 804, digital property management computing device 710 may compile the generated smart contract.

Figure 8B:
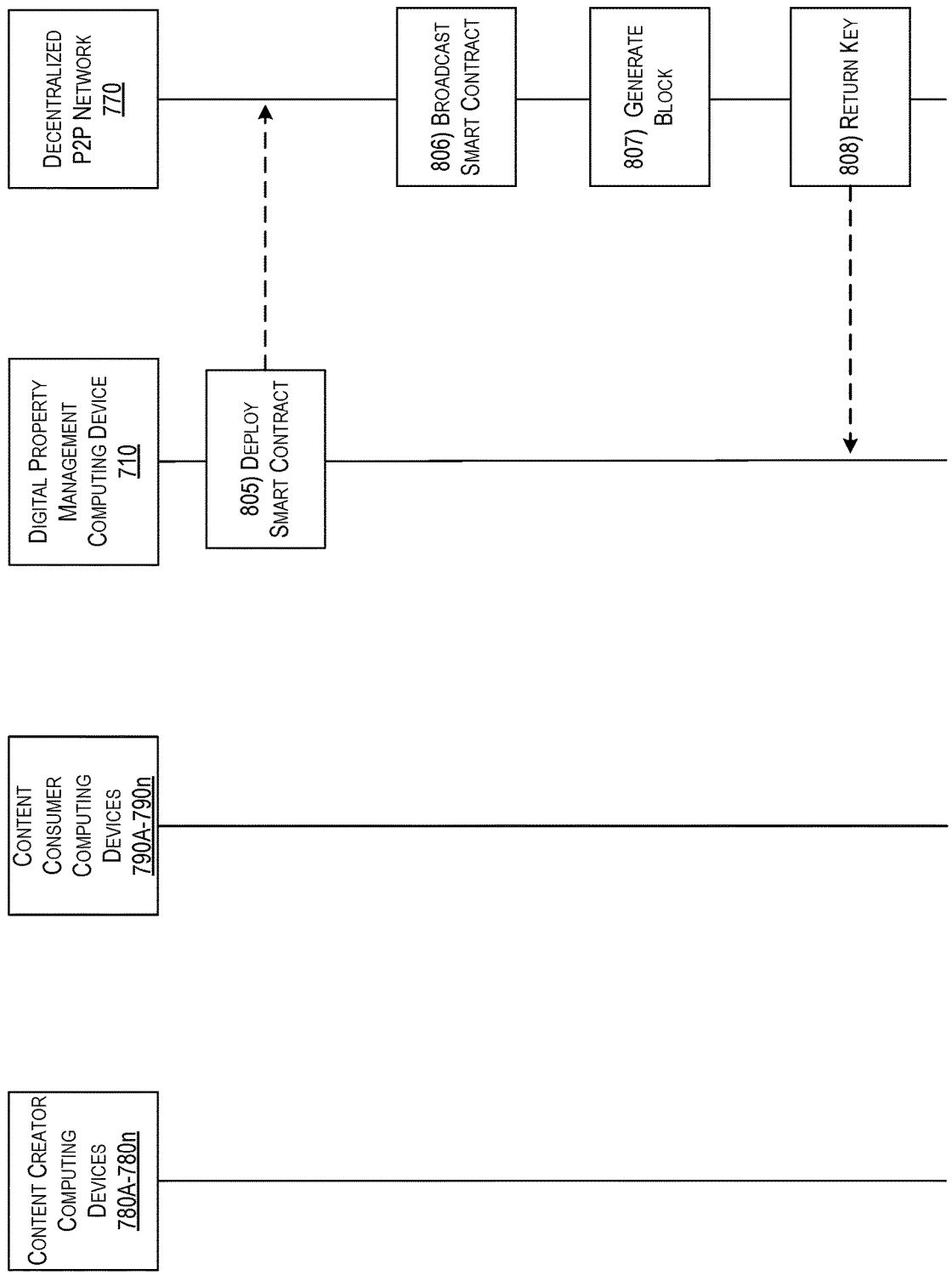

Referring to FIG. 8B, at step 805, digital property management computing device 710 may deploy the smart contract generated at step 803 to the blockchain of decentralized P2P network 770. In particular, digital property management computing device 710 may transmit a network function request to decentralized P2P network 770 which includes the smart contract.

At step 806, decentralized P2P network 770 may receive the network function request including the smart contract from digital property management computing device 710 and may broadcast the network function request to each of the full node computing devices of decentralized P2P network 770. In some instances, the broadcasting of the network function request may be performed by each of the full node computing devices comprising decentralized P2P network 770 so that each of the full node computing devices receives the network function request.

At step 807, at least one of the full node computing devices of decentralized P2P network 770 may generate a block corresponding to the blockchain of decentralized P2P network 770 and may add the block to the blockchain. In particular, at least one of the full node computing devices comprising decentralized P2P network 770 may perform one or more operations of decentralized P2P network 770 in generating the block and adding the block to the blockchain of decentralized P2P network 770. In arrangements in which digital property management computing device 710 is configured as a full node computing device in decentralized P2P network 770, digital property management computing device 710 may, in some instances, generate the block and the block to the blockchain of decentralized P2P network 770.

The generated block added to the blockchain of decentralized P2P network 770 may include the smart contract generated by digital property management computing device 710. In arrangements in which at least one of content creator computing devices 780A-780*n* is configured as a full node computing device or lightweight node computing device in decentralized P2P network 770, the at least one of content creator computing devices 780A-780*n* may generate, compile, and deploy the smart contract to decentralized P2P network 770 in a manner similar to that described above in steps 803-805.

At step 808, a public key corresponding to the smart contract stored in the blockchain of decentralized P2P network 770 may be returned by one or more of the full node computing devices of decentralized P2P network 770 to digital property management computing device 710. In some instances, the public key may be returned responsive to storing the smart contract on the blockchain of decentralized P2P network 770. As stated above, the public key corresponding to the smart contract may serve to uniquely identify the smart contract in the blockchain of decentralized P2P network 770.

Figure 8C:
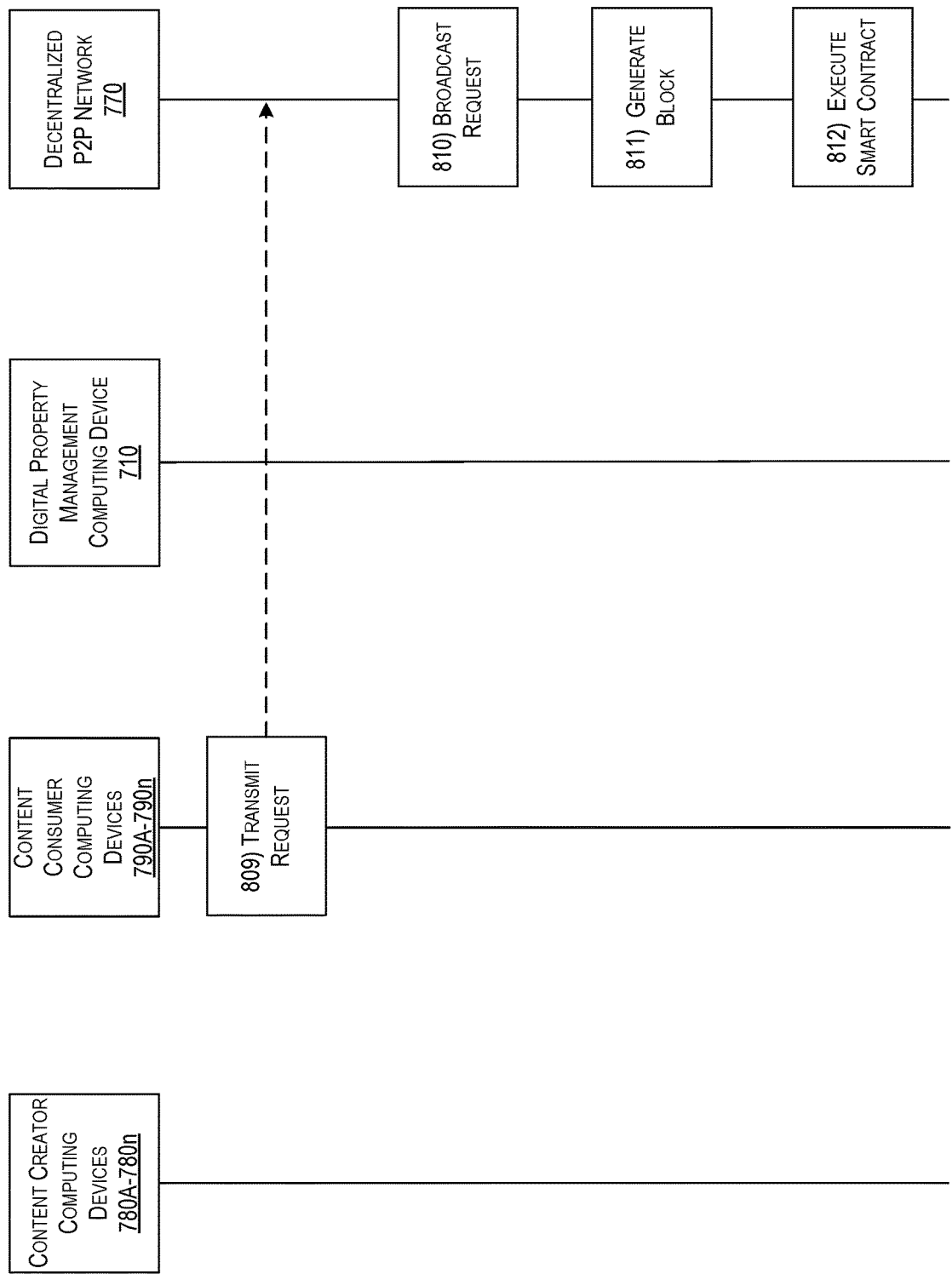

Referring to FIG. 8C, at step 809, at least one of content consumer computing devices 790A-790*n* may transmit a digital property item access request to decentralized P2P network 770. In some arrangements, the digital property item access request may be a smart contract operation request and may include the public key corresponding to the smart contract generated by digital property management computing device 710 stored in the blockchain of decentralized P2P network 770. The digital property item access request may further include a request type such as a download request or a consumption and/or usage request. Additionally, the at least one of content consumer computing devices 790A-790*n* may have a wallet stored in memory which may be associated with cryptocurrency and/or cryptocurrency digitally backed by fiat currency. In instances in which the request type is a download request, the digital property access request may include a fee, provided by the wallet of the at least one of content consumer computing devices 790A-790*n*, and associated with a permanent download of the digital property item. In instances in which the request type is a consumption and/or usage request, the digital property access request may include a fee, provided by the wallet of the at least one of content consumer computing devices 790A-790*n*, and associated with a single use download of the digital property item.

At step 810, decentralized P2P network 770 may receive the smart contract operation request from the at least one of content consumer computing devices 790A-790n and may broadcast the request to each of the full node computing devices of decentralized P2P network 770. In some instances, the broadcasting of the network function request may be performed by each of the full node computing devices comprising decentralized P2P network 770 so that each of the full node computing devices receives the smart contract operation request.

At step 811, at least one of the full node computing devices of decentralized P2P network 770 may generate a block corresponding to the blockchain of decentralized P2P network 770 and may add the block to the blockchain. In particular, at least one of the full node computing devices comprising decentralized P2P network 770 may perform one or more operations of decentralized P2P network 770 in generating the block and adding the block to the blockchain of decentralized P2P network 770. In arrangements in which digital property management computing device 710 is configured as a full node computing device in decentralized P2P network 770, digital property management computing device 710 may, in some instances, generate the block and add the block to the blockchain of decentralized P2P network 770.

At step 812, the full node computing devices of decentralized P2P network 770 may execute the smart contract generated by digital property management computing device 710. For example, in the process of adding the block comprising the smart contract operation request provided by the at least one of content consumer computing devices 790A-790n to the blockchain of decentralized P2P network 770, each of the full node computing devices of decentralized P2P network 770 may identify the block within the blockchain of decentralized P2P network 770 comprising the smart contract based on the public key corresponding to the smart contract provided by the at least one of content consumer computing devices 790A-790n. The full node computing devices of decentralized P2P network 770 may associate the fee entailed by smart contract operation request with the smart contract and may execute one or more algorithms and/or programs of the smart contract. In some instances, such processes may be performed, at least in part, by digital property management computing device 710.

Figure 8D:
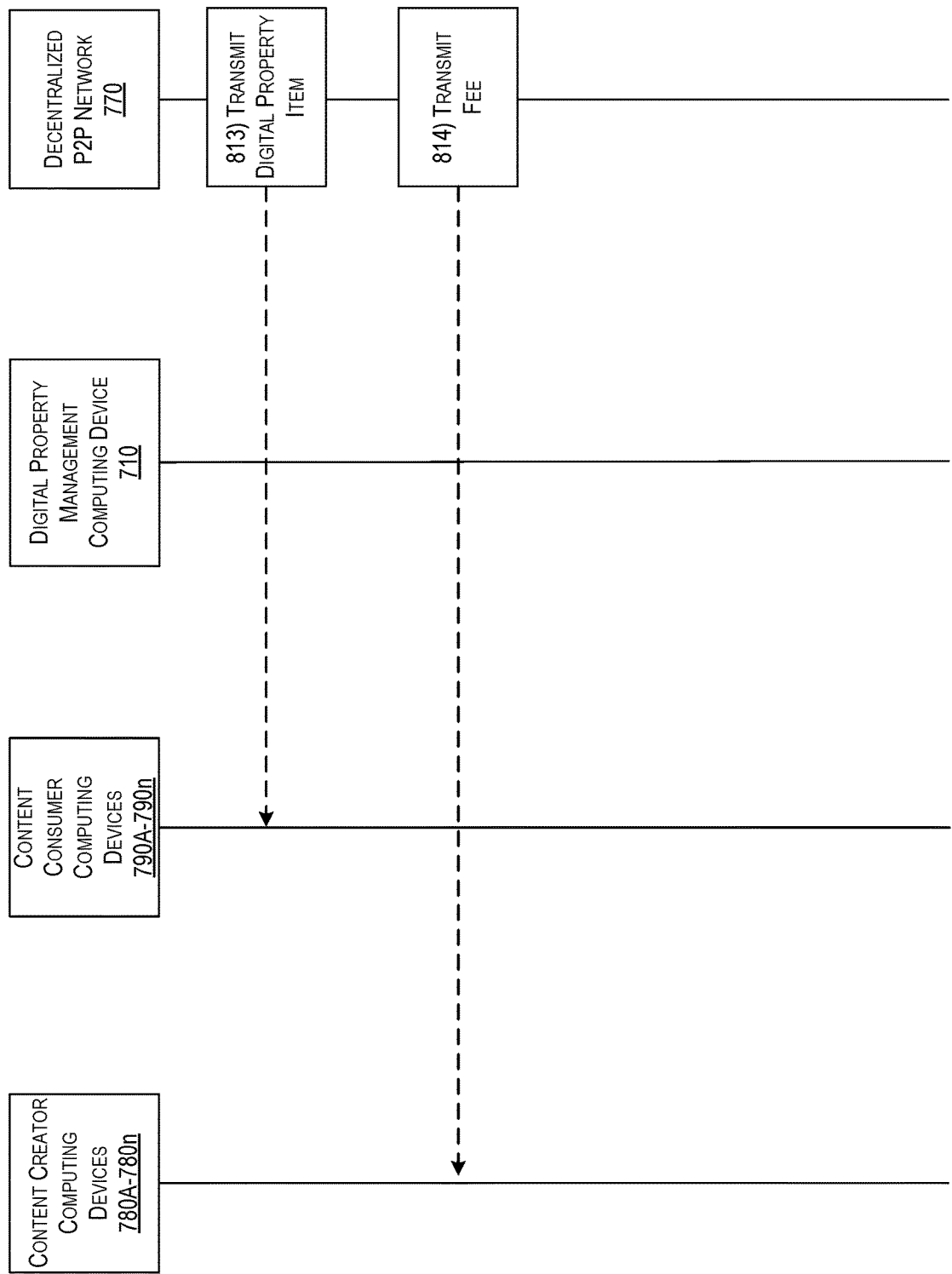

Referring to FIG. 8D, at step 813, given that the smart contract facilitates a data download of the digital property item for the at least one of the content consumer computing devices 790A-790n, execution of the smart contract may cause the full node computing devices of decentralized P2P network 770, including digital property management computing device 710, to transmit the digital property item to the at least one of the content consumer computing devices 790A-790n.

In instances in which the at least one of content consumer computing devices 790A-790n included a request type of a download request in the digital property item access request and provided the corresponding fee, execution of the smart contract may cause the full node computing devices of decentralized P2P network 770 to transmit a permanent download of the digital property item to the at least one of content consumer computing devices 790A-790n. In some instances, the permanent download of the digital property item may be associated with the wallet of the at least one of content consumer computing devices 790A-790n corresponding to decentralized P2P network 770. As such, the permanent download may be accessed through the wallet of the at least one of content consumer computing devices 790A-790n. In certain embodiments, the permanent download of the digital property item may be configured to be transmitted from the wallet of the at least one of content consumer computing devices 790A-790n to other wallets within decentralized P2P network 770, but in other embodiments, the permanent download of the digital property item may be fixed to the wallet of the at least one of content consumer computing devices 790A-790n and may not be able to be transferred to other wallets within decentralized P2P network 770. Additionally and/or alternatively, the permanent download of the digital property item may be configured to be exported from the wallet of the at least one of content consumer computing devices 790A-790n and used outside of the wallet.

In instances in which the at least one of content consumer computing devices 790A-790n included a request type of a consumption and/or usage request in the digital property item access request and provided the corresponding fee, execution of the smart contract may cause the full node computing devices of decentralized P2P network 770 to transmit a single use download of the digital property item to the at least one of content consumer computing devices 790A-790n. In some instances, the single use download may be provided to the wallet associated with the at least one of content consumer computing devices 790A-790n.

At step 814, given that the smart contract also facilitates fee payment to the at least one of content creator computing devices 780A-780n in return for the access to the digital property item for the at least one of the content consumer computing devices 790A-790n, execution of the smart contract may cause the full node computing devices of decentralized P2P network 770 to transmit the fee provided by the at least one of content consumer computing devices 790A-790n to a wallet associated with the at least one of content creator computing devices 780A-780n. In instances in which a plurality of users are noted in the smart contract as being responsible for the creation of the digital property item provided to the at least one of content consumer computing devices 790A-790n, execution of the smart contract may cause the full node computing devices of decentralized P2P network 770 to transmit the fee provided by the at least one of content consumer computing devices 790A-790n to wallets corresponding to content creator computing devices 780A-780n associated with each of the plurality of users responsible for the creation of the digital property item. In some instances, the fee may be provided in equal portions to each of the plurality of wallets. In instances in which a plurality of users are noted in the smart contract as being responsible for the creation of the digital property item with different creation responsibility percentages, execution of the smart contract may cause the full node computing devices of decentralized P2P network 770 to transmit the fee provided by the at least one of content consumer computing devices 790A-790n to wallets corresponding to content creator computing devices 780A-780n associated with each of the plurality users at respective amounts determined by the creation responsibility percentages. For example, a user with a content creation percentage of 50% may receive 50% of the fee, whereas a user with a content creation percentage of 3% may receive 3% of the fee.

Such processes described above in regard to steps 801-814 may be performed across a plurality of content consumer computing devices 790A-790n requesting access to the digital property item provided by content creator computing devices 780A-780n. For example, a plurality of content consumer computing devices 790A-790n may be able to access the digital property item through permanent download and/or one time usage and/or consumption. Accordingly, the fees corresponding to each of the plurality of accesses to the digital property item may be provided to the wallet of the at least one of content creator computing devices 780A-780n associated with the content creator.

Furthermore, such processes may be performed across a plurality of digital property items provided by one or more of content creator computing devices 780A-780n. Each unique digital property item may correspond to a smart contract stored within the blockchain of decentralized P2P network 770. In some instances, the smart contracts associated with a particular content creator may have a cross-referencing download functionality detailed by the algorithms and/or computer-executable instructions of the smart contract. For example, in the event that a content consumer transmits a digital property item access request from at least one of content consumer computing devices 790A-790n to decentralized P2P network 770 which entails a download request for a music album produced by a particular content creator, a smart contract corresponding to the album may cross-reference to smart contracts for each of the songs within the album and may facilitate the execution of each of the song-specific smart contracts to provide the user the with totality of content of the album.

Figure 9:
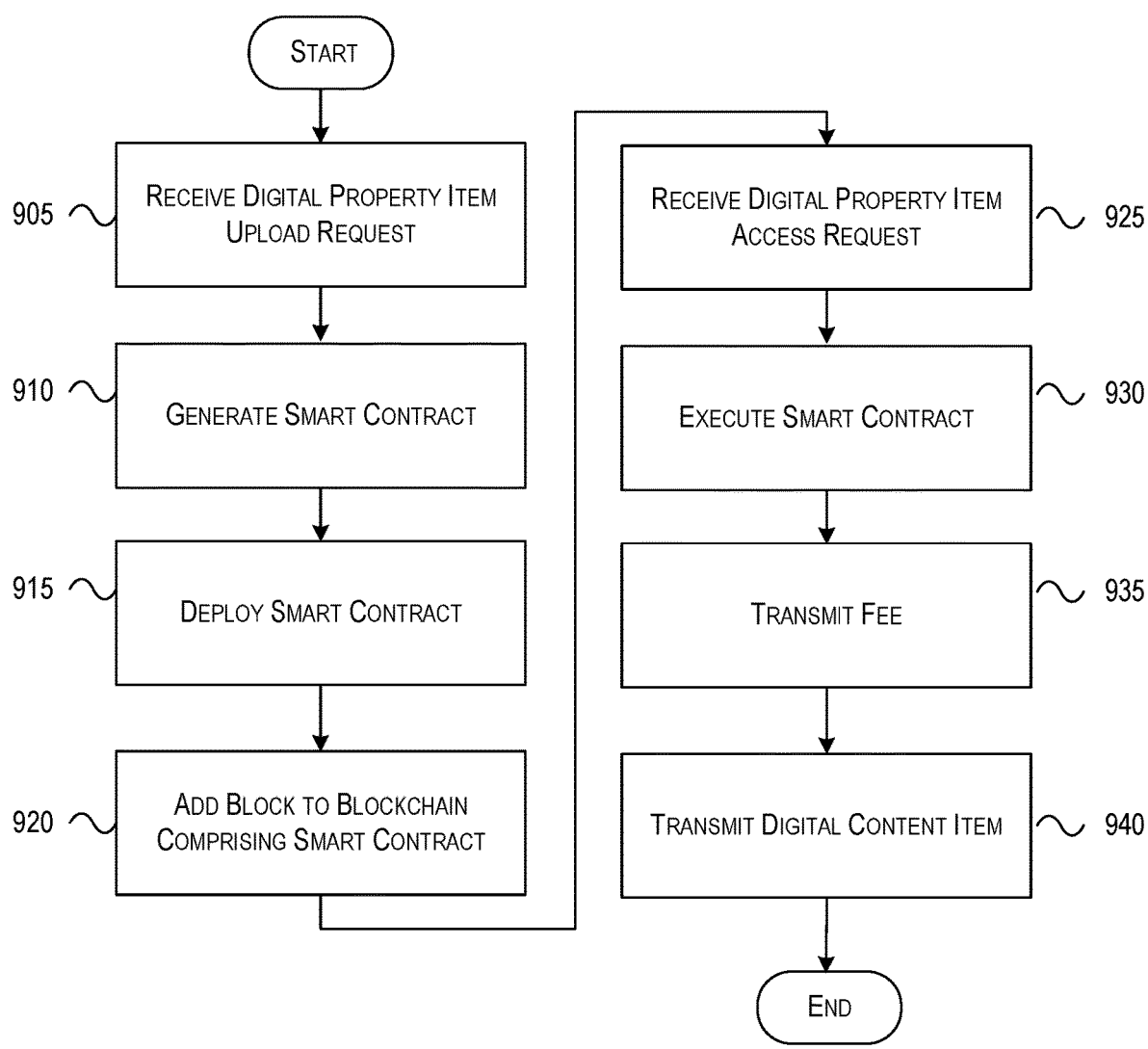
FIG. 9 depicts an illustrative method for digital property management in accordance with one or more example embodiments described herein.

FIG. 9 depicts an illustrative method for digital property management in accordance with one or more example embodiments described herein. Referring to FIG. 9, at step 905 a computing device configured to operate in a decentralized P2P network and including at least one or more processors and memory storing at least a portion of a blockchain of the decentralized P2P network may receive a digital property item upload request form at least one of a plurality of content creator computing devices, the digital property item upload request including at least an item of digital property. At step 910, based on the digital property item upload request, the computing device may generate a smart contract which facilitates a transfer of the digital property item from the blockchain to one or more content consumer computing devices. At step 915, the computing device may deploy the smart contract to the decentralized P2P network. At step 620, the computing device may add a block to the at least the portion of the blockchain of decentralized P2P network, the block comprising the smart contract. At step 925, the computing device may receive a digital property item access request, through the decentralized P2P network and from at least one of content consumer computing devices, the digital property item access request corresponding to the digital property item of the smart contract and including a fee. At step 930, based on the digital property item access request, the computing device may execute the smart contract. At step 935, responsive to execution of the smart contract, the computing device may transmit the fee provided by the at least one of the content consumer computing devices to the at least one of the content creator computing devices. At step 940, responsive to transmitting the fee, the computing device may transmit the digital property item to the at least one of the content consumer computing devices.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
at a computing device operating in a decentralized peer-to-peer (P2P) network and including at least one or more processors and memory storing at least a portion of a blockchain of the decentralized P2P network:
receiving a digital property item upload request from at least one of a plurality of content creator computing devices, the digital property item upload request including a plurality of digital property items and a corresponding fee;
based on the digital property item upload request, generating a smart contract, wherein the smart contract comprises one or more computer-executable functions configured to control downloading of the plurality of digital property items to at least one of a plurality of content consumer computing devices, and one or more computer-executable functions configured with cross-reference download functionality associated with a plurality of additional smart contracts cross-referenced by the smart contract, wherein each additional smart contract is associated with a respective digital property item of the plurality of digital property items;
deploying the smart contract to the decentralized P2P network, wherein deploying the smart contract includes:
transmitting a network function request to the decentralized P2P network; and
executing one or more P2P network protocols to broadcast the network function request to one or more computing devices in the decentralized P2P network;
generating a block corresponding to the blockchain of the decentralized P2P network, the block comprising the smart contract;
adding the block to the at least the portion of the blockchain of the decentralized P2P network;
transmitting a smart contract operation request to a digital property management computing device, wherein the smart contract operation request includes a public key that uniquely identifies the smart contract in the blockchain of the decentralized P2P network and a request type associated with the smart contract operation request;
executing the smart contract in accordance with the request type and based on identifying the block within the blockchain of the decentralized P2P network comprising the smart contract, wherein the block within the blockchain of the decentralized P2P network is identified using the public key, and wherein executing the smart contract includes identifying, based on the public key, a plurality of users associated with ownership of the plurality of digital property items and an ownership percentage for each of the plurality of users;
transmitting the corresponding fee to digital wallets of each of the plurality of users associated with ownership of the plurality of digital property items in amounts according to the ownership percentage for each of the plurality of users; and
responsive to executing the smart contract, transmitting the plurality of digital property items to the at least one of the plurality of content consumer computing devices, wherein transmitting the plurality of digital property items comprises executing of the one or more executable functions configured with cross-referencing download functionality executing the plurality of additional smart contracts cross-referenced by the smart contract and transmitting the plurality of digital property items to the at least one of the plurality of content consumer computing devices based on executing the plurality of additional smart contracts.

2. The method of claim 1, further comprising:
receiving, by the computing device, a digital property item access request through the decentralized P2P network and from at least one of content consumer computing devices;
based on the digital property item access request, transmitting, by the computing device, the fee to the smart contract; and
responsive to execution of the smart contract, transmitting, by the computing device, the fee to the at least one of the content creator computing devices.

3. The method of claim 2, wherein the fee is transmitted, by the computing device, to a first wallet of the at least one of the content creator computing devices, and wherein the plurality of digital property items is transmitted, by the computing device, to a second wallet of the at least one of the content consumer computing devices.

4. The method of claim 2, wherein the digital property item upload request further includes wallet information associated with each of a plurality of content creator computing devices and a creation responsibility percentage corresponding to each of the plurality of content creator computing devices, and wherein the fee is transmitted, by the computing device, to each of the plurality of content creator computing devices based on the wallet information and creation responsibility percentage.

5. The method of claim 2, wherein the plurality of digital property items includes at least one of a song, movie, e-book, work of art, patent, and copyright.

6. The method of claim 2, wherein the fee corresponds to a permanent download of the plurality of digital property items.

7. The method of claim 2, wherein the fee corresponds to a single use download of the plurality of digital property items.

8. A computing device configured to operate in a decentralized peer-to-peer (P2P) network, comprising:
one or more processors; and
memory storing at least a portion of a blockchain of the decentralized P2P network and computer-readable instructions that, when executed by the one or more processors, cause the computing device to:
receive a digital property item upload request from at least one of a plurality of content creator computing devices, the digital property item upload request including a plurality of digital property items and a corresponding fee;
based on the digital property item upload request, generate a smart contract, wherein the smart contract comprises one or more computer-executable functions configured to control downloading of the plurality of digital property items to at least one of a plurality of content consumer computing devices, and one or more computer-executable functions configured with cross-reference download functionality associated with a plurality of additional smart contracts cross-referenced by the smart contract, wherein each additional smart contract is associated with a respective digital property item of the plurality of digital property items;
deploy the smart contract to the decentralized P2P network, wherein deploying the smart contract includes:
transmitting a network function request to the decentralized P2P network; and
executing one or more P2P network protocols to broadcast the network function request to one or more computing devices in the decentralized P2P network;
generate a block corresponding to the blockchain of the decentralized P2P network, the block comprising the smart contract;
add the block to the at least the portion of the blockchain of the decentralized P2P network;
transmit a smart contract operation request to a digital property management computing device, wherein the smart contract operation request includes a public key that uniquely identifies the smart contract in the blockchain of the decentralized P2P network and a request type associated with the smart contract operation request;
execute the smart contract in accordance with the request type and based on identifying the block within the blockchain of the decentralized P2P network comprising the smart contract, wherein the block with the blockchain of the decentralized P2P network is identified using the public key, and wherein executing the smart contract includes identifying, based on the public key, a plurality of users associated with ownership of the plurality of digital property items and an ownership percentage for each of the plurality of users;
transmit the corresponding fee to digital wallets of each of the plurality of users associated with ownership of the plurality of digital property items in amounts according to the ownership percentage for each of the plurality of users; and
responsive to executing the smart contract, transmit the plurality of digital property items to the at least one of the plurality of content consumer computing devices, wherein transmitting the plurality of digital property items comprises executing of the one or more executable functions configured with cross-referencing download functionality executing the plurality of additional smart contracts cross-referenced by the smart contract and transmitting the plurality of digital property items to the at least one of the plurality of content consumer computing devices based on executing the plurality of additional smart contracts.

9. The computing device of claim 8, wherein the memory stores further instructions that, when executed by the one or more processors, cause the computing device to:
receive a digital property item access request through the decentralized P2P network and from at least one of content consumer computing devices;
based on the digital property item access request, transmit the fee to the smart contract; and
responsive to execution of the smart contract, transmit the fee to the at least one of the content creator computing devices.

10. The computing device of claim 9, wherein the memory stores further instructions that, when executed by the one or more processors, cause the computing device to:
transmit the fee to a first wallet of the at least one of the content creator computing devices; and
transmitting the plurality of digital property items to a second wallet of the at least one of the content consumer computing devices.

11. The computing device of claim 9, wherein the digital property item upload request further includes wallet information associated with each of a plurality of content creator computing devices and a creation responsibility percentage corresponding to each of the plurality of content creator computing devices, and wherein the memory stores further instructions that, when executed by the one or more processors, cause the computing device to transmit the fee to each of the plurality of content creator computing devices based on the wallet information and the creation responsibility percentage.

12. The computing device of claim 9, wherein the plurality of digital property items includes at least one of a song, movie, e-book, work of art, patent, and copyright.

13. The computing device of claim 9, wherein the fee corresponds to a permanent download of the plurality of digital property items.

14. The computing device of claim 9, wherein the fee corresponds to a single use download of the plurality of digital property items.

15. One or more non-transitory computer-readable media storing instructions that, when executed by a computing device configured to operate in a decentralized peer-to-peer (P2P) network, the computing device including at least one or more processors and memory storing at least a portion of a blockchain of the decentralized P2P network, cause the computing device to:
receive a digital property item upload request from at least one of a plurality of content creator computing devices, the digital property item upload request including a plurality of digital property items and a corresponding fee;
based on the digital property item upload request, generate a smart contract, wherein the smart contract comprises one or more computer-executable functions configured to control downloading of the plurality of digital property items to at least one of a plurality of content consumer computing devices, and one or more computer-executable functions configured with cross-reference download functionality associated with a plurality of additional smart contracts cross-referenced by the smart contract, wherein each additional smart contract is associated with a respective digital property item of the plurality of digital property items;
deploy the smart contract to the decentralized P2P network, wherein deploying the smart contract includes:
transmitting a network function request to the decentralized P2P network; and
executing one or more P2P network protocols to broadcast the network function request to one or more computing devices in the decentralized P2P network;
generate a block corresponding to the blockchain of the decentralized P2P network, the block comprising the smart contract;
add the block to the at least the portion of the blockchain of the decentralized P2P network;
transmit a smart contract operation request to a digital property management computing device, wherein the smart contract operation request includes a public key that uniquely identifies the smart contract in the blockchain of the decentralized P2P network and a request type associated with the smart contract operation request;
execute the smart contract in accordance with the request type and based on identifying the block within the blockchain of the decentralized P2P network comprising the smart contract, wherein the block with the blockchain of the decentralized P2P network is identified using the public key, and wherein executing the smart contract includes identifying, based on the public key, a plurality of users associated with ownership of the plurality of digital property items and an ownership percentage for each of the plurality of users;
transmit the corresponding fee to digital wallets of each of the plurality of users associated with ownership of the plurality of digital property items in amounts according to the ownership percentage for each of the plurality of users; and
responsive to executing the smart contract, transmit the plurality of digital property items to the at least one of the plurality of content consumer computing devices, wherein transmitting the plurality of digital property items comprises executing of the one or more executable functions configured with cross-referencing download functionality executing the plurality of additional smart contracts cross-referenced by the smart contract and transmitting the plurality of digital property items to the at least one of the plurality of content consumer computing devices based on executing the plurality of additional smart contracts.

16. The one or more non-transitory computer-readable media of claim 15, wherein the instructions, when executed by the computing device configured to operate in the decentralized P2P network, the computing device including at least the one or more processors and the memory storing at least the portion of the blockchain of the decentralized P2P network, further cause the computing device to:
receive a digital property item access request through the decentralized P2P network and from at least one of content consumer computing devices;
based on the digital property item access request, transmit the fee to the smart contract; and
responsive to execution of the smart contract, transmit the fee to the at least one of the content creator computing devices.

17. The one or more non-transitory computer-readable media of claim 16, wherein the instructions, when executed by the computing device configured to operate in the decentralized P2P network, the computing device including at least the one or more processors and the memory storing at least the portion of the blockchain of the decentralized P2P network, further cause the computing device to:
transmit the fee to a first wallet of the at least one of the content creator computing devices; and
transmit the plurality of digital property items to a second wallet of the at least one of the content consumer computing devices.

18. The one or more non-transitory computer-readable media of claim 16, wherein the digital property item upload request further includes wallet information associated with each of a plurality of content creator computing devices and a creation responsibility percentage corresponding to each of the plurality of content creator computing devices, and wherein the fee is transmitted to each of the plurality of content creator computing devices based on the wallet information and creation responsibility percentage.

19. The one or more non-transitory computer-readable media of claim 16, wherein the fee corresponds to a permanent download of the plurality of digital property items.

20. The one or more non-transitory computer-readable media of claim 16, wherein the fee corresponds to a single use download of the plurality of digital property items.

* * * * *